US012491131B2

(12) United States Patent
Vare et al.

(10) Patent No.: US 12,491,131 B2
(45) Date of Patent: Dec. 9, 2025

(54) SAUNA HEATING APPARATUS AND METHOD OF HEATING SAUNA SWEAT ROOM

(71) Applicant: Saunum Group AS, Tallinn (EE)

(72) Inventors: Andrus Vare, Tallinn (EE); Ardi Lippur, Käina (EE); Meelis Unt, Tallinn (EE); Rannar Pärn, Tartu (EE)

(73) Assignee: Saunum Group AS, Tallinn (EE)

( * ) Notice: Subject to any disclaimer, the term of this patent is extended or adjusted under 35 U.S.C. 154(b) by 110 days.

(21) Appl. No.: 18/571,295

(22) PCT Filed: Jun. 16, 2022

(86) PCT No.: PCT/EP2022/066502
§ 371 (c)(1),
(2) Date: Dec. 18, 2023

(87) PCT Pub. No.: WO2022/268649
PCT Pub. Date: Dec. 29, 2022

(65) Prior Publication Data

US 2024/0293284 A1 Sep. 5, 2024

(30) Foreign Application Priority Data

Jun. 21, 2021 (FI) ...................................... 20215724

(51) Int. Cl.
*A61H 33/06* (2006.01)

(52) U.S. Cl.
CPC ......... *A61H 33/063* (2013.01); *A61H 33/066* (2013.01); *A61H 2033/061* (2013.01);
(Continued)

(58) Field of Classification Search
CPC ................ A61H 33/063; A61H 33/066; A61H 2033/061; A61H 2201/0192;
(Continued)

(56) References Cited

U.S. PATENT DOCUMENTS

2001/0003216 A1* 6/2001 Komulainen .......... A62C 37/46
4/524

FOREIGN PATENT DOCUMENTS

AU 2021101554 A4 5/2021
DE 2160571 B1 4/1973
(Continued)

OTHER PUBLICATIONS

Finnish Patent and Registration Office, Office Action, Application No. 20215724, mailed Feb. 9, 2024, 11 pages.
(Continued)

*Primary Examiner* — Lori L Baker
(74) *Attorney, Agent, or Firm* — ZIEGLER IP LAW GROUP, LLC.

(57) ABSTRACT

An apparatus, method and computer program of heating a sauna sweat room for providing a comfortable temperature and environment in the sauna sweat room for a pleasant sauna experience. The apparatus includes a heating unit comprising a heat accumulator and a duct for collecting a hot air and a cool air and enabling the mix of the collected hot and cool air for providing homogenous temperature in the sauna sweat room. The method includes receiving the hot air heated by the heat accumulator in the at least one duct, receiving in the at least one duct the cool air, mixing the received hot air with the received cool air to obtain a mixed air stream, directing at least part of the mixed air stream towards a lower section of the sauna sweat room via the second end of the at least one duct.

25 Claims, 7 Drawing Sheets

(52) U.S. Cl.
CPC ................ *A61H 2201/0192* (2013.01); *A61H 2201/0207* (2013.01); *A61H 2201/0242* (2013.01); *A61H 2201/0257* (2013.01); *A61H 2201/10* (2013.01); *A61H 2201/5058* (2013.01)

(58) Field of Classification Search
CPC .... A61H 2201/0207; A61H 2201/0242; A61H 2201/0257; A61H 2201/10; A61H 2201/5058; A61H 33/067
USPC .............................. 4/524, 535; 607/1, 81, 83
See application file for complete search history.

(56) References Cited

FOREIGN PATENT DOCUMENTS

| | | | | | |
|---|---|---|---|---|---|
| EP | 3167864 | A1 | | 10/2018 | |
| FI | 20215724 | A1 | * | 12/2022 | A61H 33/066 |
| JP | 2005021427 | A | | 1/2005 | |
| KR | 101495822 | B1 | | 2/2015 | |
| WO | WO-9734562 | A2 | * | 9/1997 | A61H 33/063 |
| WO | 2006135308 | A1 | | 12/2006 | |

OTHER PUBLICATIONS

European Patent Office, International Search Report and Written Opinion of the International Searching Authority, Application No. PCT/EP2022/066502, mailed Sep. 23, 2022, 16 pages.
European Patent Office, The International Preliminary Report on Patentability, Sep. 6, 2023, 21 pages.
Finnish Patent and Registration Office, Search Report, Application No. 20215724, Dated Jan. 20, 2022, 2 pages.
Vare Andrus, "Sanum's climate system devices H-1/6 and H-1/9 for saunas. Instructions for use and Installation" Dated Mar. 27, 2019, Retrieved from https://sanum.com/wp-content/uploads/2020/09/SaunumPremium2020.pdf, 112 pages. https://www.youtube.com/watch?v=7rhkWdntb00, Apr. 15, 2020; https://web.archive.org/web/20210517182532/https://saunum.com/product/saunum-premium/ May 17, 2021; https://web.archive.org/web/20210617011804/https://saunum.com/; Jun. 17, 2021.

* cited by examiner

SAUNA HEATING APPARATUS AND METHOD OF HEATING SAUNA SWEAT ROOM

TECHNICAL FIELD

The present disclosure relates generally to the field of sanitary ware and more specifically to apparatuses of saunas. The present disclosure discloses an apparatus of heating a sauna sweat room and a method of heating a sauna sweat room. The present disclosure also relates to a computer program for controlling the sauna heating system.

BACKGROUND

A sauna is a place to experience dry or wet heat sessions. When using the sauna, the skin temperature of a person rises roughly to 40° C. leading to heavy sweating. The saunas provide multiple health benefits including detoxification, increased metabolism, weight loss, increased blood circulation, pain reduction, antiaging, skin rejuvenation, improved cardiovascular function, improved immune function, improved sleep, stress management, and relaxation. The sauna comprises a sauna sweat room, where heat is generated by a sauna heater comprising heating elements and rocks. The heating elements of the sauna heater are heating the rocks, which accumulate the heat and constantly release the heat into the sauna sweat room. Generally, the sauna heater may be a wood, a gas or an electric sauna heater. Electrical heaters are widely used in modern sauna sweat rooms, as these are easy to install and use. The sauna sweat room can be either dry or humid. The humid sauna sweat room also comprises a hot steam besides the heat, the hot steam is produced generally by pouring water over the heated rocks. The dry sauna sweat room is used by heating only the rocks without generating any hot steam.

However, a typical electrical sauna heater does not enable to configure an even temperature inside the sauna sweat room, as hot air, hot steam or hot air and hot steam from the sauna heater accumulates in the upper sections of the sauna sweat room leaving lower sections cooler. Standard height of the sauna sweat room is typically about 2-2.5 meters (m) and when a person is sitting on a sauna bench, his head is at height of about 1.9-2.4 m, where in the heated sauna sweat room the temperature can reach from 100° C. up to 140° C. However, the feet of the person will be about at height of 0.7 m, where temperature may be only between about 25° C.-40° C. Such a temperature difference between the level of the feet and the head is not healthy, is tiring and heavy for the heart, as the heart must start pumping extra blood to cool down the head and body goes under stress because of uneven temperature.

In another aspect, the sauna bench in the sauna sweat room must be positioned at a certain height so that people are able to experience the sauna. When the sauna bench is too low, the air surrounding people is not hot enough and no sauna effect or sweating is achieved. Therefore, benches must be located at a higher level. However, this means, that persons desiring to enjoy the sauna have to climb up to a higher sauna bench, which can be dangerous for example due to the wet sauna floor. Also, higher sauna benches are not reachable for everyone, for example for children, elderly people or people using a wheelchair. Staying in a lower level in the sauna sweat room however does not provide the same sauna experience as in the upper level.

Furthermore, the unpleasant or inconvenient climate inside the sauna sweat room is caused by heating air via open heating elements of the sauna heater, which burn out oxygen and dust in the sauna sweat room. This leads to an uncomfortable feeling while breathing inside the sauna sweat room.

Also, some of the sauna sweat rooms are rather small and narrow and therefore can only accommodate very little equipment, as otherwise lack of space becomes dangerous as one may stumble over a hot heating unit. Therefore, besides a sauna heating unit, it is not wise to add any other equipment, that could soften the climate inside the sauna sweat room.

In one another aspect, some sauna sweat rooms may have a quite high ceiling besides being small and narrow. For example, sauna sweat rooms in apartment buildings or iglu saunas may have high ceiling, which means, that lot of energy and heat has to put in to heat up lower layers of the sauna sweat room. This leads to ineffective and wasteful energy use. Also, as the heat accumulates in the upper sections, the temperature difference between head and feet of the sauna user is significant and unpleasant.

Another problem is the humid environment of the sauna sweat rooms, which is a good growth environment for harmful bacteria. Therefore, the sauna sweat room cannot be totally used for health improvement goals. Besides using the sauna sweat room for cleansing therapy via sweating, it can also be used for example for salt therapy or halotherapy. However, in typical saunas, the salt is just placed on a container or vessel for generating a salty environment. However, this way, the useful potential of the salt cannot be totally used. The salty environment is generated by just placing a vessel with salt into the sauna sweat room, which is not effective to generate a salty effect.

Also, it is possible to generate a special environment inside the sauna sweat room by providing aromatherapy, a salty environment or purifying air with ions. However, for aromatherapy, essential oils are generally just added to heated rocks by a sauna scoop, but this way, the oil will burn on the heated rocks and will generate carbon monoxide and carbon dioxide, which is unhealthy to breathe.

Therefore, in light of the foregoing discussion, there exists a need to overcome the aforementioned drawbacks associated with apparatuses and methods of heating sauna sweat rooms.

SUMMARY

An object of the present disclosure is to provide an apparatus of heating a sauna sweat room. Another object of the present disclosure is to provide a solution that overcomes at least partially the problems encountered in the prior art.

In one aspect, an embodiment of the present disclosure provides an apparatus of heating a sauna sweat room, the apparatus comprising a heating unit comprising at least one heating element, a heat accumulator at least partially surrounding the at least one heating element; a duct comprising a first end and a second end, wherein the second end is located lower than the first end, at least one first air inlet configured to receive at least hot air heated by the heat accumulator, the hot air having temperature from 50° up to 170° C., at least one ventilator unit located lower from a central area of the duct between the first end and the second end of the duct, the at least one ventilator unit is configured to direct at least part of the hot air heated by the heat accumulator from the at least one first air inlet towards the second end, at least one air outlet located at the second end and configured to release the received hot air heated by the heat accumulator towards a lower section of the sauna sweat room.

In one aspect, an embodiment of the present disclosure provides an apparatus of heating a sauna sweat room, the apparatus comprising a heating unit comprising at least one heating element, a heat accumulator at least partially surrounding the at least one heating element; at least one duct connected to the heating unit, the at least one duct comprising a first end and a second end, wherein the second end is located lower than the first end, at least one first air inlet configured to receive at least hot air directly from the heat accumulator, the hot air having temperature from 50° up to 170° C., at least one ventilator unit inside the at least one duct, the at least one ventilator unit is configured to direct at least part of the hot air heated by the heat accumulator from the at least one first air inlet towards the second end, at least one air outlet located at the second end and configured to release the received hot air heated by the heat accumulator towards a lower section of the sauna sweat room.

In another aspect, an embodiment of the present disclosure provides a method of heating a sauna sweat room, the method comprising providing heat to a heat accumulator by at least one heating element comprised in a heating unit; receiving a hot air directly from the heat accumulator in at least one duct connected to the heating unit, the at least one duct comprising a first end and a second end, the hot air having temperature from 50° up to 170° C.; directing at least part of the mixed hot air towards a lower section of the sauna sweat room via the second end of the at least one duct by using a ventilator unit inside the at least one duct.

In another aspect, an embodiment of the present disclosure provides a method of heating a sauna sweat room, the method comprising receiving a hot air heated by a heat accumulator in a duct comprising a first end and a second end, the hot air having temperature from 50° up to 170° C.; receiving in the duct a cool air having lower temperature than the hot air; mixing the received hot air with the received cool air to obtain a mixed air stream; directing at least part of the mixed air stream towards a lower section of the sauna sweat room via the second end of the duct.

In an aspect, an embodiment of the present disclosure provides a computer program for controlling a sauna heating system comprising instructions which, when the computer program is executed by a control system comprising a control unit, causes the control system to perform the method according to the present disclosure.

In an aspect, an embodiment of the present disclosure provides a computer program for controlling a sauna heating system comprising an apparatus of heating a sauna sweat room, the computer program comprising instructions which, when the computer program is executed by a control system comprising a control unit, causes the control system to perform the method according to the present disclosure.

Embodiments of the present disclosure substantially eliminate or at least partially address the aforementioned problems in the prior art, and enable to provide a comfortable temperature and environment in the sauna sweat room having the sauna heater and providing a pleasant sauna experience.

The apparatus of heating a sauna sweat room enables to generate uniform temperature throughout the sauna sweat room without a need of adding more than one device inside the sauna sweat room.

Furthermore, the apparatus of heating a sauna sweat room also saves energy and can also be used in sauna sweat rooms, which are small and/or have high ceilings, to save energy on heating and without taking too much space. Therefore, the apparatus of heating a sauna sweat room optimises energy and heating in various sauna sweat rooms without taking extra space besides sauna heating unit and leaving enough space for moving around without a risk of stumbling over the hot heating unit.

Additional aspects, advantages, features and objects of the present disclosure will be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF DRAWINGS

Embodiments of the present disclosure will now be described, by way of example only, with references to the following diagrams wherein.

DETAILED DESCRIPTION OF EMBODIMENTS

Figure 1:
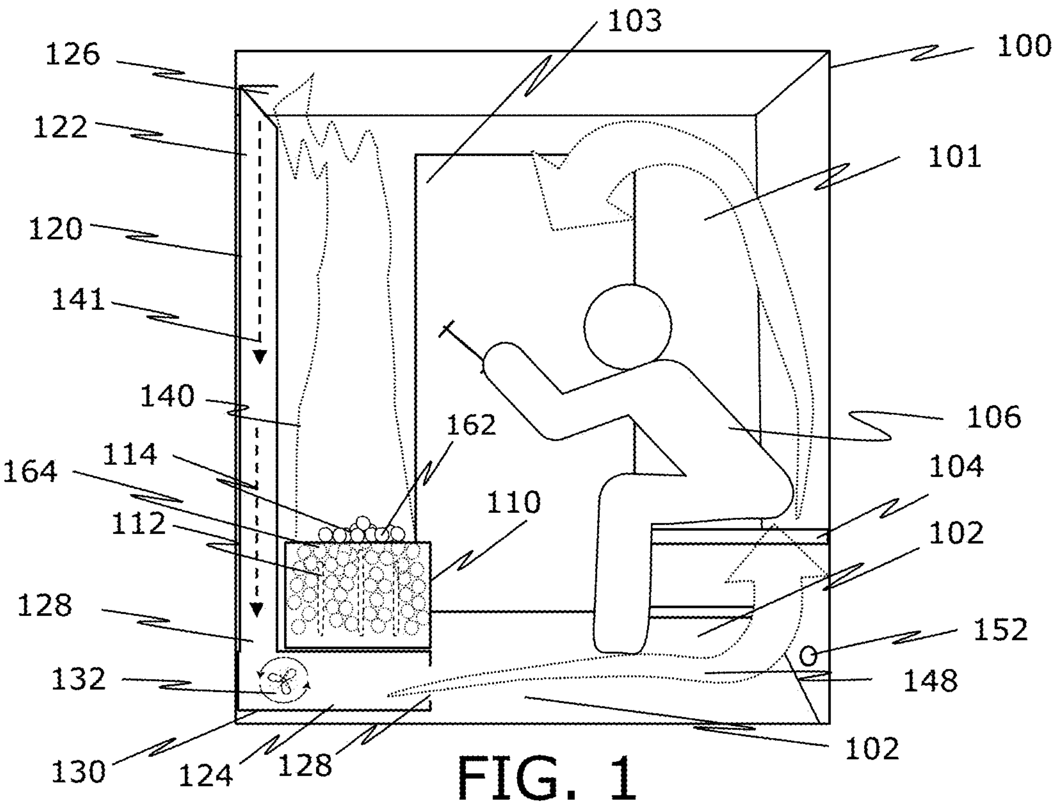
FIG. 1 illustrates a side view of an embodiment of an apparatus of heating a sauna sweat room according to the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible. Furthermore, what has been described for the apparatus also corresponds to the method of the present disclosure.

In one aspect, an embodiment of the present disclosure provides an apparatus of heating a sauna sweat room, the apparatus comprising a heating unit comprising at least one heating element, a heat accumulator at least partially surrounding the at least one heating element; at least one duct connected to the heating unit, the at least one duct comprising a first end and a second end, wherein the second end is located lower than the first end, at least one first air inlet configured to receive at least hot air heated by directly from the heat accumulator, the hot air having temperature from 50° up to 170° C., at least one ventilator unit inside the at least one duct, the at least one ventilator unit is configured to direct at least part of the hot air heated by the heat accumulator from the at least one first air inlet towards the second end, at least one air outlet located at the second end and configured to release the received hot air heated by the heat accumulator towards a lower section of the sauna sweat room.

In one aspect, an embodiment of the present disclosure provides a method of heating a sauna sweat room, the method comprising providing heat to a heat accumulator by at least one heating element comprised in a heating unit; receiving a hot air directly from the heat accumulator in an at least one duct connected to the heating unit, the at least one duct comprising a first end and a second end, the hot air having a temperature from 50° up to 170° C.; directing at least part of the hot air towards a lower section of the sauna sweat room via the second end of the at least one duct by using at least one ventilator unit inside the at least one duct.

The "sauna" in the present application is a Finnish or other such type of sauna (e.g., Estonian sauna, Russian sauna) comprising a sauna sweat room, wherein air of the sauna sweat room is heated up by a wood stove or electric stove with stones on top of the wood fire chamber or on top and around the electric heating elements. The air of the sauna sweat room may also be heated up by a gas stove. The heated stones function as a heat accumulator. The heated air in the sauna sweat room is normally from 60° C. up to 120° C. degrees. To have an effective sauna session, the air of the sauna sweat room should be at least 60° C. Temperatures above 120° C. degrees are not easy to bear, however, it is possible that the air temperature in the sauna sweat room is above 120° C. degrees. A person starts to sweat in the sauna sweat room because of the raised skin temperature caused by heating. With lower temperatures, such as below 60° C. degrees, it takes too much time to raise the skin temperature and cause heavy sweating effect. For an effective sauna session, the heavy sweating should start within 10 minutes. However, it is also possible to enjoy sauna below 60° C. degrees. The sauna sweat room comprises a heating unit and at least one sauna bench. The heating unit can be an electrical heating unit, a gas heating unit or a wood burning heating unit. The sauna sweat room can be divided into an upper section and a lower section. The upper section further comprises a ceiling area. The lower section further comprises a floor area. The lower section is 50% of the height from a floor towards a ceiling of the sauna sweat room. Depending on the sauna sweat room size the lower section may be e.g., from the floor up to about 10, 15, 20, 25, 30, 35, 40, 45, 50, 55, 60, 65, 70, 75, 80, 85, 90, 95, 100, 105, 110, 115, 120, 125, 130, 135, 140, 145 or 150 cm in height. The temperature in the lower section may be thus between 25° C.-50° C. or less than 25° C. if fresh air is led into the sweat room from outside the sauna during winter time. The upper section is another 50% of the height from the ceiling towards the floor of the sauna sweat room. The ceiling area of the upper section is the highest part below the ceiling of the sauna sweat room. The ceiling area may comprise the height from 15% up to 25% below the ceiling of the sauna sweat room. The floor area of the lower section is the lowest part above the floor of the sauna sweat room. The floor area may comprise from 15% up to 25% of the height above the floor of the sauna sweat room. The sauna benches are typically located at several levels, wherein the main bench can be in the upper section and at higher level than the electrical heating unit. When the person sits on the main bench, his head can reach the ceiling area, however, the feet will be in the lower section of the sauna sweat room. The sauna benches can be located against the wall of the sauna sweat room leaving a distance between the electrical heating unit and the sauna benches.

The heating unit comprises at least one heating element and a heat accumulator at least partially surrounding the at least one heating element. The heating element provides heat to a heat accumulator by the at least one heating element comprised in the heating unit. The at least one heating element heats up the at least one heat accumulator from which, while being warm or hot, the hot air as dry heat is constantly released to heat up the sauna sweat room.

In an embodiment, the heating unit is an electrical heating unit. The at least one heating element can be an electrical heating element, that provides and heats up the heat accumulator, which in turn constantly releases the heat into the sauna sweat room while being warm or hot. The at least one heating element can be regulated via special thyristors (semiconductor elements), which allow lowering the temperature of the at least one heating element when a desired temperature in the sauna sweat room is reached. This allows to regulate the sauna sweat room temperature more precisely, ensures better sauna climate and also, such automation works quietly. The heating element may be in direct contact with the air.

The apparatus further comprises at least one duct connected to the heating unit, the at least one duct comprising a first end and a second end, wherein the second end is located lower than the first end and the at least one duct is arranged to form an air tunnel. The at least one duct in this context is a tubular passageway for directing hot air, hot steam or hot air and hot steam from the first end towards the second end of the at least one duct. The first end of the at least one duct may be located higher than the heat accumulator. In some embodiments, the first end of the at least one duct may be at the same height as the heat accumulator. In other embodiments the first end may extend into the heating unit or close to the heat accumulator. Such an apparatus can be easily placed into the centre of the sauna sweat room and be surrounded by the sauna benches. In yet another embodiment, the first end may extend up until a ceiling area of the sauna sweat room. The second end of the at least one duct may extend towards the floor area of the sauna sweat room.

The shape of the at least one duct may vary. In an embodiment, the at least one duct is a vertical pipe extending from the upper section towards the lower section of the sauna sweat room. In another embodiment, the at least one duct may extend diagonally from the upper section towards the lower section of the sauna sweat room. In different embodiments, the at least one duct may be e.g., a l-shaped, L-shaped, /-shaped, Y-shaped, S-shaped or T-shaped. Different shapes of the at least one duct enable placing the at least one duct into sauna sweat rooms having various sizes and configurations. For example, in the sauna sweat room having a window, the electrical heating unit could also be placed under the window and the at least one duct may be S-shaped as not to cover the window. The at least one duct is connected to the heating unit to enable receiving hot air directly from the heating unit, where the temperature of the hot air is the highest. It is important to receive the hot air directly from the heat accumulator, as collecting hot air further away from the heat accumulator enables at least part of the hot air to accumulate in the upper sections. Also, by collecting the hot air directly from heat accumulator ensures, that the hottest air is collected leading to less energy losses. In an embodiment, the at least one duct is vertically attached to a side of the heating unit. In an embodiment, the apparatus may comprise one duct, in another embodiment, the apparatus may comprise two or more ducts. The ducts may be attached to the sides of the heating unit.

The at least one duct comprises at least one first air inlet configured to receive at least hot air directly from the heat accumulator, the hot air having temperature from 50° up to 170° C. The hot air is directly received from the heat accumulator in an at least one duct connected to the heating unit, the at least one duct comprising a first end and a second end, the hot air having a temperature from 50° up to 170° C. The at least one first air inlet is directed towards the heat accumulator to enable direct collection of the hot air. By the words “configured to receive at least hot air directly from the heat accumulator” it is meant, that the at least one first air inlet can be furthest above the heat accumulator to collect the hot air rising up from the heat accumulator. A distance in height between the at least one air inlet from the heat accumulator can be from 0 cm up to 200 cm. In an embodiment the distance in height may be from 0 cm, 5 cm, 10 cm, 20 cm, 30 cm, 40 cm, 50 cm, 60 cm, 70 cm, 80 cm, 90 cm, 100, cm, 110, cm 120, cm, 130 cm, 140 cm, 150 cm, 160 cm up to 100, cm, 110, cm 120, cm, 130 cm, 140 cm, 150 cm, 160, 170 cm, 180 cm, 190 cm and 200 cm. Having the distance in height of 0 cm between the heat accumulator and the at least one first air inlet means that the at least one first air inlet is inside the heating unit. When the distance in height is from 0 cm, 5 cm, 10 cm, 20 cm, 30 cm up to 20 cm, 30 cm, 40 cm and 50 cm, the at least one first air inlet is directly above the electrical heating unit or on at least one side of the electrical heating unit. When the distance in height between the at least one air inlet and the heat accumulator is from 50 cm, 60 cm, 70 cm, 80 cm, 90 cm, 100, cm, 110, cm 120, cm, 130 cm, 140 cm, 150 cm, 160 cm up to 100, cm, 110, cm 120, cm, 130 cm, 140 cm, 150 cm, 160, 170 cm, 180 cm, 190 cm and 200 cm the at least one first air inlet is located above the heat accumulator to receive the hot air directly from the heat accumulator. This way the hot air rising up from the heat accumulator can be directly collected into the at least one first air inlet with minimum losses in heat. If the hot air would be collected from any other location than above the heat accumulator in a distance from 50 up to 200 cm, the heat loss would be higher and some of the hot air will accumulate in the upper section of the sauna sweat room.

The at least one duct further comprises at least one ventilator unit inside the at least one duct, the at least one ventilator unit is configured to direct at least part of the hot air heated by the heat accumulator from the at least one first air inlet towards the second end. The at least part of the hot air is directed towards a lower section of the sauna sweat room via the second end of the at least one duct by using at least one ventilator unit inside the at least one duct. The at least one ventilator unit comprises a turbine, which creates positive pressure inside the at least one duct to such in the hot air and to direct at least part of the hot air towards the second end of the at least one duct. A power of the ventilator unit is dependent on the distance between the at least one air inlet and the heat accumulator. The bigger distance between the at least one air inlet and the heat accumulator, the higher power of the ventilator unit is applied, as otherwise there would be losses in collecting the hot air directly from the heat accumulator. If the distance in height between the at least one air inlet and the heat accumulator is more than 50 cm, 60 cm, 70 cm, 80 cm, 90 cm, 100, cm, 110, cm 120, cm, 130 cm, 140 cm, 150 cm, 160 cm up to 100, cm, 110, cm 120, cm, 130 cm, 140 cm, 150 cm, 160, 170 cm, 180 cm, 190 cm and 200 cm the higher power of the ventilator unit is applied. The ventilator unit may continuously direct at least part of the hot air collected by the at least first air inlet towards the second end of the at least one duct.

In an embodiment, the at least one ventilator unit is located lower from the at least one first air inlet. This way, a positive pressure is generated in the apparatus comprising at least one second air inlet for directing mixed air stream towards the floor area of the sauna sweat room.

Furthermore, the at least one ventilator unit does not need to be heat resistant and the at least one ventilator unit works more efficiently. The further away the at least one ventilator unit is from the at least one air inlet, the better absorption of the hot air and mixing the hot and cool air is obtained. Moreover, the risk of overheating the at least one ventilator unit is reduced.

In an embodiment, the at least one ventilator unit is located lower from the heat accumulator. The temperatures above the heat accumulator are higher and therefore, a heat resistant ventilator unit is necessary, when located at the same height or higher than the heat accumulator. Having the at least one ventilator unit located lower from the heat accumulator enables more efficient and energy saving operation of the at least one ventilator unit. Furthermore, the at least one ventilator unit does not need to be heat resistant.

The hot air with temperature above 50° C. heats up skin of the human causing thereby sweating. The hot air may have temperature from 50, 51, 52, 53, 55, 60, 65, 70, 80, 90, 100, 120, 140 or 160° C. up to 55, 60, 65, 70, 80, 90, 100, 120, 140, 160 or 170° C. Thus, e.g., at height 2.1 meters the hot air may be in the upper section between to 90° C.-170° C., 120° C.-150° C., 90° C.-150° C., 120° C.-170° C., 150° C.-170° ° C., 120° C.-150° C. If not collected into the at least one duct, the hot air heated by the heat accumulator accumulates in the upper section of the sauna sweat room. However, in the present disclosure, the at least one air inlet collects the hot air from the heat accumulator of the heating unit, thereby enabling the hot air to accumulate only in the upper section of the sauna sweat room. The at least one air inlet can be an opening inside the at least one duct, which draws the hot air into the at least one duct. The at least one first air inlet may be located at the first end of the at least one duct. The at least one duct extending into the heating unit or close to the heat accumulator and having the at least one first air inlet in the first end of the at least one duct enables direct collection of the at least hot air, whereby the hot air cannot rise up to the upper section and the ceiling area. In other embodiments, the at least one air inlet may be located on the sides of the at least one duct and the at least one air inlet is located higher than the heat accumulator. It is important, that the at least one duct is connected to the heating unit for receiving the hot air directly from the heat accumulator, otherwise there could be losses in receiving the hot air in the at least one duct making the apparatus less effective and enabling the hot air to partly accumulate in the upper sections, which in longer period of time will affect the quality of the sauna session.

The at least one duct further comprises at least one air outlet located at the second end and configured to release at least part of the received hot air heated by the heat accumulator towards a lower section of the sauna sweat room. The at least part of the hot air is directed towards a lower section of the sauna sweat room via the second end of the at least one duct by using at least one ventilator unit. The at least one air outlet can be an opening in the second end of the at least one duct via which at least part of the hot air is directed out of the at least one duct. In other embodiments, the at least one air outlet can be located in the at least one duct lower than the ventilator unit. Directing at least part of the hot air out from the at least one duct lower than the ventilator unit enables to direct at least part of the hot air towards the lower section of the sauna sweat room. Furthermore, the at least one air outlet may direct the hot air under the sauna benches. Thereby, the at least part of the hot air rising from the lower section or the floor area of the sauna sweat room enables smooth heating throughout the sauna sweat room, where the feet of the person sitting on the sauna bench are not surrounded by significantly cooler air than the head.

The apparatus and the method of heating a sauna sweat room can continuously heat up and circulate air inside the sauna sweat room by heating and collecting the hot air from the heat accumulator and directing the hot air via the at least one duct towards the lower section. The continuous circulation of the air inside the sauna sweat room leads to more efficient contact of the hot air and the skin causing a better sauna effect and effective sweating of the body. Furthermore, the sauna sweat room comprising the apparatus does not necessarily need the sauna benches at different levels. For example, the sauna bench may also be located only in the lower section as the temperature throughout the sauna sweat room is homogeneous. Therefore, instead of having sauna benches at several levels, wherein the main bench is in the upper section, sauna benches can be positioned in the lower section. This way, the sauna benches are easily reachable also for children, elderly people or handicapped people. A person using a wheelchair can easily enter the sauna sweat room with his wheelchair and does not need to relocate himself onto the sauna bench as the same sauna experience can be obtained also in the lower section of the sauna sweat room. The sauna bench may also be a deck chair in the lower section for comfortably enjoying sauna experience. Also, the apparatus of heating a sauna sweat room as a single device comprising the heating unit and the duct is a compact device and does not occupy more floor space than just a sauna heating unit, which may be an electrical, wood or gas heating unit. This ensures, that enough space will be left for users when moving in and out from the sauna sweat room without a risk of stumbling upon the heating unit and burning oneself. Furthermore, such an apparatus and method of heating a sauna sweat room can save energy in various sauna sweat rooms. For example, the sauna sweat rooms having high ceilings, the apparatus of heating a sauna sweat room enables to create uniform temperature by circulating the hot air and not enabling the hot air to first accumulate only in the upper sections of the sauna sweat room.

According to the embodiments of the present disclosure, the hot air further comprises hot steam generated by water directed onto the heat accumulator. The hot steam may be generated by adding water onto the heat accumulator. Because of the heat, the water will evaporate rapidly causing a rise of hot steam from the heat accumulator. The hot steam can be used to have the humid sauna and the hot steam also facilitates heating up the sauna sweat room. Generally, the water is thrown on the heat accumulator using a sauna scoop. However, the apparatus may further comprise a water adding unit, which is configured to add a predefined amount of water during predefined time periods. The water may also be sprayed on the heat accumulator by a sprayer or sprinkled by a sprinkler. The water may be directed onto the heat accumulator based on the feedback from a humidity sensor. The water adding unit may start directing the water onto the heat accumulator only when temperature of at least 50° C. is achieved, as otherwise the heat accumulator is not hot enough to generate the hot steam. A steam sauna can be generated by directing water onto the heat accumulator and directing the hot air stream comprising the hot steam towards the sauna sweat room.

In an embodiment, the at least one duct further comprises at least one second air inlet configured to receive a cool air having lower temperature than the hot air, wherein the at least one ventilator unit is further configured to mix the cool air with the hot air to obtain a mixed air stream, and wherein the at least one air outlet is further configured to direct the mixed air stream towards the floor area of the sauna sweat room. The cool air may have a temperature from 15° C. up to 70° C. The cool air may have a temperature from 15, 17, 19, 21, 23, 25, 27, 29, 31, 33, 35, 37, 39, 41, 43, 45, 47, 49, 51, 53, 55, 57, 59, 61, 63, 65, 67, 69, or 71° C. up to 16, 18, 20, 22, 24, 26, 28, 30, 32, 34, 36, 38, 40, 42, 44, 46, 48, 50, 52, 54, 56, 58, 60, 62, 64, 66, 70 or 72° C. In the embodiments, wherein the cool air is obtained from the external ventilation unit the temperature of the cool air is less than the temperature of the air received from the heat accumulator. In some embodiments, wherein the cool air is obtained from outside the sauna, the temperature of the cool air may be less than 15° C. or below 0° C. when the cool air is led into the sweat room from outside the sauna during winter time.

In an embodiment, the cool air will be mixed with the hot air by the ventilator unit inside the at least one duct and thereby the mixed air stream is obtained. The at least one air outlet directs the mixed air stream towards the lower section or the floor area of the sauna sweat room. The at least one second air inlet may be an opening in the at least one duct configured to suck and control the flow rate of the cool air into the at least one duct. The at least one air outlet may be an opening which is configured to control the rate of the mixed air stream to be directed towards the lower section or the floor area. The mixed air stream has a temperature lower than the hot air and therefore the mixed air stream is milder than the hot air. By releasing the mixed air stream towards the floor area of the sauna sweat room enables to obtain smooth and pleasant temperature throughout the sauna sweat room from the floor area of the lower section up to the ceiling area of the upper section. Thereby, the legs and the head of the person will be surrounded with similar temperature and no stress will be caused to the body of the person in the sauna sweat room. The temperature of the mixed air may be from 51, 53, 55, 57, 59, 61, 63, 65, 67, 69, 71, 73, 75, 77, 79, 81, 83, 85, 87, 89 or 91° C. up to 52, 54, 56, 58, 60, 62, 64, 66, 68, 70, 72, 74, 76, 78, 80, 82, 84, 86, 88, 90 or 92° C.

In another embodiment, the apparatus further comprises at least one second air inlet configured to receive a cool air from a floor area of the lower section of the sauna sweat room and the at least one air outlet is configured to mix the cool air with the hot air before directing the mixed air stream towards the floor area of the sauna sweat room. In this embodiment, the apparatus may comprise a duct and/or an opening to receive the cool air from the lower section, for example from the floor area of the sauna sweat room. The hot air will be directed via the at least one ventilator unit towards the at least one air outlet. The cool air will be united with the hot air before the at least one air outlet and a mixed air stream is obtained for directing the mixed air stream towards the floor area of the sauna sweat room. In this embodiment, the cool air can be taken from the lowest sections of the sauna sweat room and the at least one ventilator unit is not necessary for mixing the hot air and the cool air, but the at least one ventilator unit can be used only for directing the hot air towards the at least one air outlet.

In an embodiment, the at least one second air inlet is configured to receive the cool air from at least one of selected from: outside the sauna sweat room, the lower section of the sauna sweat room, a floor area of the lower section of the sauna sweat room, an external ventilation unit. The at least one second air inlet may comprise a tubular passageway extending outside from the wall of the sauna sweat room to receive the cool air outside of the sauna sweat room. For example, the tubular passageway of the at least one second air inlet may extend to a sauna anteroom, any other room or outside to receive the cool air from open air. The at least one second air inlet may be located in the lower section or may comprise a tubular passageway to the lower section of the sauna sweat room to receive the cool air from lower section or the floor area. The at least one second air inlet may be connected to the external ventilation unit or directly to the ventilation tunnel to receive the cool air from an external ventilation system. The cool air collected from outside the sauna sweat room or from the external ventilation unit comprises more oxygen and therefore, the air quality in the sauna sweat room can be raised. The at least one second air inlet may be located at multiple positions on the at least one duct to receive the cool air from multiple locations at same or different time periods. The air inlets may be located on one or both sides of the at least one duct.

In an embodiment, at least one of the at least one first air inlet, the at least one second air inlet, and the at least one air outlet comprises a damper. The damper regulates the hot air, cool air, or hot air and cool air flow into the at least one duct and also the hot air or the mixed air stream from the at least one duct to the sauna sweat room. The damper may be regulated manually or automatically (e.g., by one or more servomotors) based on the preferences of the user or conditions inside the sauna sweat room. The damper may regulate to collect more hot air or to collect less hot air into the at least one duct, to collect more cool air or less cool air into the at least one duct. The damper may regulate to direct more hot air or less hot air into the sauna sweat room, to direct more mixed air stream or less mixer air stream into the sauna sweat room. The damper enables control of the flow rates into the at least one duct or outside from the at least one duct and allows thereby to adjust suitable conditions inside the sauna sweat room. The ratio may be set the amount of air is divided into 60%-70% of the air intake from the lower air layers and 30%-40% of the air intake from either the above heating unit or inside the heating unit.

The manually or automatically adjustable damper further enables to close or open the air inlets and air outlets and thus to regulate the amount of air directed through the heating unit, i.e., more specifically, through the heat accumulator. Regulating the amount of air directed through the heating unit enables different heating regimes.

E.g., in an embodiment, wherein the apparatus is configured to heat the sauna sweat room in a faster heating regime (e.g., within 20-40 minutes) by directing the air through the cool air inlets under the bottom of the heating unit and when the desired temperature (e.g., 80° C.) of the sauna sweat room is achieved then the temperature of the heat accumulator (e.g., the set of stones) may be about 120°-160° C.

E.g., in another embodiment, when the apparatus is configured to heat the sauna sweat room in a slower heating regime (e.g., within approximately 1-3 hours) then the cool air inlet may be closed or partly closed to direct less cool air (e.g., approximately 70%-80% less than during the faster heating regime) through the heating unit. This enables to achieve higher temperature of the heat accumulator (e.g., the set of stones), e.g., 250° C.-300° C., the air of the sauna sweat room is heated up slowly due to the heat transfer from the heat accumulator to the air in the sauna sweat room. In such heating regime, the heating time may be about 20%-60% longer than faster heating regime, but the environment of the sauna sweat room is more healthier and due to the higher temperature of the heat accumulator it enables to achieve more steam when water is poured to the hot heat accumulator and thus to provide more pleasure.

In an embodiment, the electrical heating unit comprises empty spaces located at least one of selected from inside the heat accumulator, or between the at least one heating element and the heat accumulator. In the embodiments, wherein the heating unit comprises the set of stones or the stone basket as the heat accumulator, the empty spaces are formed between the stones and between the stones and the heating element. The empty spaces comprise air and enable even heating of the sauna sweat room. The empty spaces may further comprise valves on top or on bottom of the empty spaces. The valves enable it to regulate the amount of the air inside the empty spaces.

In an embodiment, the heat accumulator comprises at least one of selected from a set of stones, a stone basket. The heat accumulator may comprise stones, which are igneous, heavy and rough or smooth surfaced. The stones may be stacked onto each other forming the set of stones and surround the at least one heating element. The stones may be gathered inside a metal basket, named as stone basket. The heat from the at least one heating element will be accumulated inside the stones, which will further constantly emit the heat, while being warm or hot. Thereat, the pile made of stones in the heat accumulator may be higher in the middle, where the stone due to the thicker layer of stones have lower temperature than the stones on the sides. The stones on the sides are closer to the heating elements and due to the less stones, the temperature of the stones gets higher. The stone having higher temperature thus provide more heat and when to pour water on those stones the evaporation is more intense than in the region where there are thicker layer of stones and the temperature of stones is lower. The heat accumulator comprising at least one of selected from a set of stones, a stone basket, effectively accumulates heat from the at least one heating element and constantly provides heat inside the sauna sweat room while being warm or hot.

In an embodiment, the electrical heating unit further comprises at least one water reservoir. The at least one water reservoir is configured to comprise water and may be a container, a vessel, a receptacle, or any other object suitable to accommodate the water. The at least one water reservoir may be located next to the heat accumulator to provide humidity. In an embodiment, the at least one water reservoir is recessed into the stone basket or between the stones of the set of stones. In other embodiments, the at least one water reservoir is placed into the empty spaces. The at least one water reservoir enables to adjust humidity levels of the sauna sweat room as by heating the heat accumulator, the water from the at least one water reservoir starts to evaporate and increases humidity levels inside the sauna sweat room.

In embodiments of the present disclosure, height of the at least one duct may be adjustable. As the sweat rooms of the saunas are not standardized and the height of the sweat room may vary, then having adjustable height of the at least one duct enables the installation of the apparatus to the sweat room easily without the need to change anything in the sweat room construction. The at least one duct may comprise a telescopic mechanism, which easily enables to shorten or expand the height of the at least one duct depending on the need. The at least one duct may also comprise of multiple portions, which can be removed or reinstalled to adjust the height of the at least one duct.

According to the embodiments of the present disclosure, the at least one duct may be installed on the wall of the sauna sweat room, may be installed into the wall of the sauna sweat room or may be located away from the wall of the sauna sweat room.

According to embodiments, the at least one ventilator unit further comprises a therapy means comprising at least one of selected from an apparatus for generating aromatherapy, an air ionizer, a salty environment generator. The apparatus can be used to generate a special environment comprising aroma, ions or salt inside the sauna sweat room.

The apparatus for generating aromatherapy is a device, which enables the distribution of aromas from essential oils to the sauna sweat room. In prior art, essential oils are generally added into water, which is then poured onto the heat accumulator for example with the sauna scoop. This however may lead to burning of essential oils because of the direct contact either with the heat accumulator or the at least one heating element. The at least one ventilator unit comprising the apparatus for generating aromatherapy delivers aromas from the essential oils via the mixed air stream towards the sauna sweat room, which enables better distribution of the aromas and no burning of the essential oils. The apparatus for generating aromatherapy may also be a sprayer that may work manually or automatically and that may supply a certain amount of essential oils during predefined time periods to the sauna sweat room. Alternatively, the apparatus for generating aromatherapy may be a container or vessel comprising essential oils. The container or vessel may be placed in front of the ventilator, wherein the ventilator enables the essential oils to volatilize from the container or vessel to the sauna sweat room.

The air ionizer generates negative ions to purify the air inside the sauna sweat room and therefore a fresh and clean environment is obtained. The mixed air stream from the ventilator unit will be directed through the air ionizer before reaching the sauna sweat room. The ionizer can remove bacteria, allergens, dust and also nasty odours. The air cleaned by the ionizer will create a calm and pleasant atmosphere inside the sauna sweat room.

According to the embodiments of the present disclosure the salty environment generator may be used to create a salt sauna effect. Typically, the salty environment is generated by blocks of salt lined on the sauna sweat room walls. The salty environment may also be generated by placing a vessel comprising salt inside the sauna sweat room. The salt will release negative ions that create a fresh and clean environment, which is great for the respiratory system and has many health benefits including controlling blood sugar level in the body and also mood. Salt also acts as a natural antibacterial and strengthens the immune system. The salty environment enables a person to relax physically, mentally and relieves stress. The known solutions for creating salty environment do not enable the salt ions to volatilize so that the air in the sauna sweat room would be homogenously enriched with the alt ions, thus some areas of the sauna sweat room do not provide any effect that salty environment could provide. The ventilator unit, according to the embodiments of the present disclosure, comprising the salty environment generator enables better, more effective and homogenous distribution of the negative ions generated by the salt into the sauna sweat room than salt lined on the sauna sweat room walls or just the salt vessel in the sauna sweat room. The hot air or the mixed air stream will be enriched with the negative ions from the salt before releasing towards the sauna sweat room. The salt will dissolve by the moisture in the mixed air stream or the salt ions may also be taken by turbulent flow of the hot air. The salty environment generator may be a salt nozzle or a salt capsule through which a hot air or the mixed air stream is blown. The salt in the salty environment generator may comprise e.g., sea salt, Himalayan salt, mixture of different type of salts or any other suitable salt. The salt in the salty environment generator may comprise also salt mixed with essential oils, which provides additional healthy and relaxing effects.

According to the embodiments of the present disclosure, the at least one first air inlet can be configured to collect hot air from at least one location of the sauna sweat room selected from a ceiling area of the upper section of the sauna sweat room, a floor area of the lower section of the sauna sweat room, directly above the electrical heating unit, inside the electrical heating unit, directly above the heat accumulator, directly inside the heat accumulator. The hot air, the hot steam or the hot air and the hot stream provided by the heat accumulator will be released into the sauna sweat room and directed to the upper section. This however will leave the lower section much cooler than the upper section and will cause discomfort to the person sitting on the sauna bench, having his head in the upper section of the sauna sweat room. The at least one first air inlet is configured to collect the hot air into the at least one duct. To avoid the hot hair accumulating only in the upper section, the hot air can be collected from multiple regions of the sauna sweat room or directly from the heat accumulator or from inside the heat accumulator. By collecting the hot air by the at least one first inlet, the hot air cannot accumulate only in the upper section of the sauna sweat room and a milder environment can be generated. The hot air will then be directed via the at least one duct and the ventilator unit towards the lower section, which enables to fill the sauna sweat room evenly and creates a pleasant environment.

The hot air, the hot steam or the hot air and the hot stream may be collected directly above the heat accumulator or directly inside the heat accumulator. This will ensure that there are no losses on directing the hot air, the hot steam or the hot air and the hot stream into the at least one duct. Also, generally, the air above the electrical heating unit is burning hot and it is not recommended to place for example hands above the electrical heating unit, when in use. However, when the hot air, the hot steam or the hot air and the hot stream is collected before it can rise from the electrical heating unit, it is safe to touch the air above the electrical heating unit as well.

According to the embodiments of the present disclosure the blowing direction of the at least one ventilator unit may be at least one of selected from towards the second end of the at least one duct, or towards the first end of the at least one duct. The ventilator unit blowing towards the second end of the at least one duct directs the hot air or the mixed air stream to the lower section of the sauna sweat room, which enables even distribution of the hot air or the mixed air stream inside the sauna sweat room. The ventilator unit can also be switched to blow in the direction towards the first end of the at least one duct. This way, the cool air collected into the at least one duct can be directed towards the upper section of the sauna sweat room and enables cooling down the upper section. The blowing direction of the ventilator unit can be controlled manually or automatically and thereby, the inside climate of the sauna sweat room is adjusted according to chosen preferences. For example, if the person sitting on the sauna bench feels that air surrounding his head is too hot, the ventilator unit blowing direction can be switched to blow towards the first end of the at least one duct and thereby leading the cool air to the upper section of the sauna sweat room to cool down the air.

Furthermore, the blowing direction can be adjusted based on the feedback from at least one of selected from a $CO_2$ sensor, a temperature sensor, a sensor configured to detect users inside the sauna sweat room, a sensor configured to detect the state of a sauna door, a humidity sensor. For example, when the $CO_2$ sensor detects high levels of $CO_2$ in the sauna sweat room, the blowing direction may be adjusted to blow more cool air towards the first end of the at least one duct, wherein the cool air may be collected outside from the sauna sweat room or from the external ventilation unit.

According to some embodiments of the present disclosure, the two or more heating elements are positioned at different heights. The heating elements may be located parallel to each other. The heating elements may also be located horizontally or vertically. One or more heating elements may be located lower than the remaining one or more heating elements inside the heat accumulator. Having one or more heating elements higher results in that the top part of the heat accumulator is at least partially cooler than the lower part of the heat accumulator. This ensures that the hot steam generated by the heat accumulator feels softer and evaporation lasts longer.

According to the embodiments of the present disclosure, the apparatus may further comprise a control system comprising a control unit, and at least one sensor selected from a temperature sensor configured to measure temperature inside the sauna sweat room, a $CO_2$ sensor configured to measure $CO_2$ level inside the sauna sweat room, an oxygen sensor configured to measure oxygen level inside the sauna sweat room, a sensor configured to detect users inside the sauna sweat room, a sensor configured to detect a state of a sauna door, a humidity sensor configured to measure humidity inside the sauna sweat room, a ventilator speed regulator configured to control a speed of the at least one ventilator unit, a damper regulating unit configured to regulate the at least one damper in an open or closed position.

The control unit is configured to control temperature inside the sauna sweat room. According to energy demand, the control unit may be configured to switch the at least one heating element on or off. Furthermore, the control unit may switch on and off one or more of the at least one heating element at different time periods. At the beginning of heating the sauna sweat room, the control unit may switch on the at least one heating element. Once a desired temperature is achieved, the control unit may switch off one or more of the at least one heating elements. The control unit may control the speed of the turbine of the ventilator unit. Also, based on the feedback of the sensor configured to detect users inside the sauna sweat room, the control unit may not allow the start of the ventilation unit without any persons inside the sauna sweat room. The control unit may increase the speed of the turbine of the ventilator unit once the water is added to the heat accumulator. This will enable more efficient distribution of the hot steam into the lower section of the sauna sweat room. The control system controlling the apparatus helps to adjust the sauna sweat room conditions according to desired conditions and also makes the apparatus more energy efficient.

The temperature sensor may measure the temperature inside the sauna sweat room at different locations, for example in the lower section, in the upper section, in the floor area, in the ceiling area. Based on the measured temperature, the ventilation speed of the ventilator unit or damper of the at least one first air inlet, at least one air outlet or at least one second air inlet may be adjusted to change the temperature inside the sauna sweat room. For example, when the measured temperature is too hot, the damper of the at least one second air inlet may be open more to take more cool air into the at least one duct and to provide cooler air towards the sauna sweat room. Also, when the temperature measured in the upper section is too hot, the ventilation unit blowing direction can be adjusted to blow cool air into the upper section of the sauna seat room.

Furthermore, based on the measured temperature, the at least one heating element is controlled either to switch on or off the heating. For example, as the volume of the heat accumulator may be large, then heating with the at least one heater at full power to obtain the desired temperature may create a situation where, after reaching the temperature, the at least one heating element is switched off but the room temperature can rise up to 15° C. more due to the heat accumulated in the heat accumulator. To prevent this, based on the measured temperature, the control system switches the at least one heating element off for example 10 minutes or 10° C. before the desired temperature is expected to be reached, and the temperature sensor measures the temperature change for example within 1-2 minutes and based on that the control system either switches the at least one heating element on or off.

The $CO_2$ sensor is configured to measure the $CO_2$ level inside the sauna sweat room. The $CO_2$ sensor may ensure demand-based ventilation. As sauna sweat rooms are often small and many people are seated at the same time, the ventilation provided by normal ventilation is often not enough. It is considered that per person the ventilation should be about 5 L/s, but such ventilation is usually not available in the sauna sweat rooms, also such ventilation removes too much heat from the sauna sweat room and would not be efficient. The preferred $CO_2$ levels should not exceed from 450 ppm up to 1200 ppm, because more than 1200 ppm causes drowsiness and headaches. Thus, according to the embodiments, the $CO_2$ level can be from 450, 500, 550, 600, 650, 700, 750, 800, 850, 900, 950, 1000, 1050, 1100 or 1150 ppm up to 475, 525, 575, 625, 675, 725, 775, 825, 875, 925, 975, 1025, 1075, 1125 or 1175 or 1225 pm. Preferably the $CO_2$ level can be for example 450 ppm-650 ppm or 500 ppm-600 pmm.

The apparatus comprising the $CO_2$ sensor can provide instructions to open the ventilation ducts on a demand basis. When measured $CO_2$ level is too high, the damper of the at least one second air inlet may be configured to receive more cool air containing oxygen into the at least one duct for providing more cool air towards the sauna sweat room. Also, when measuring high levels of $CO_2$, an alarm may inform the persons inside the sauna sweat room. The alarm may also start when the oxygen sensor measures oxygen level drop inside the sauna sweat room. Also, when the measured oxygen level is too low, the at least one second air inlet may collect more cool air comprising oxygen into the at least one duct for providing more cool air towards the sauna sweat room. The cool air comprising oxygen in these cases may be collected from outside the sauna sweat room or an external ventilation unit. Tracking the $CO_2$ concentrations with the $CO_2$ sensor also enables to save energy, as cool air can be collected based on the $CO_2$ level feedback. For example, to ensure good air quality inside the sauna sweat room, the amount of inburst and outburst of the fresh air by ventilation must be substantially high. However, having controlled $CO_2$ levels enable to adjust the amount of ventilation and the cool air on the need basis. This solution ensures a healthy sauna climate and saves a large amount of heat energy, as ventilation no longer works on a calculation basis (i.e., how many people sit in the sauna), but on a need basis.

In different embodiments, in order to increase the efficiency of the need based ventilation, the ventilation air inlet, i.e., the at least one second air inlet, can be placed before the ventilation unit of the apparatus, which creates an additional air reduction and intensifies the ventilation.

The sensor configured to detect users inside the sauna sweat room may be used to detect whether a person has stayed inside the sauna sweat room for too long. In countries with a high amount of sauna users the mortality rate caused by health failures during sauna sessions is also high. Some people also take sauna sessions without any company, which means that there is nobody to check the status of the person taking the sauna. Therefore, when high temperature, high $CO_2$ levels or low oxygen levels are detected, the sensor can further detect, if there is a person inside the sauna sweat room, who must be warned. Furthermore, on detecting inappropriate conditions and at least one person present in the sauna sweat room, the apparatus can be used to adjust the inside climate conditions of the sauna sweat room so as not to cause any harm to the persons inside the sauna sweat room. Based on the feedback from the sensor configured to detect users inside the sauna sweat room the speed of the turbine of the ventilation unit can be adjusted and more cool air may be collected and directed to the sauna sweat room. Furthermore, the sensor configured to detect users inside the sauna sweat room may be connected to for example to WiFi for sending an alert about the person staying too long inside the sauna sweat room.

The sensor configured to detect a state of a sauna door may detect whether the door is open or closed. It is important to keep the sauna sweat room door fully closed, when taking a sauna, as otherwise the temperature drops very fast and sauna conditions cannot be achieved.

The humidity sensor configured to measure humidity inside the sauna sweat room measures the humidity and this way it can be detected, whether it is a dry or humid sauna. A common problem in sauna sweat rooms with electrical heaters is that the air is too dry, humidity level about 10%, as the at least one heating element is drying the air. However, by controlling the humidity levels with the humidity sensor, it enables to activate a water adding unit to provide water to the heat accumulator, once too low humidity level is detected and the temperature above 50 C inside the sauna sweat room is achieved. The preferred humidity level during a sauna session is from 40% up to 80%, which is healthy for lungs and skin and also facilitates heat transmission between skin and air leading to more active sweating. Based on the humidity levels, the apparatus can be adjusted for achieving the desired sauna effect, whether the humid or the dry sauna is expected.

The ventilator speed regulator configured to control a speed of the at least one ventilator unit may adjust the speed based on the feedback from at least one of selected from the $CO_2$ sensor, the temperature sensor, the sensor configured to detect users inside the sauna sweat room, the sensor configured to detect a state of a sauna door, the humidity sensor. Based on the feedback from the previously mentioned sensors, the ventilator speed regulator unit may accelerate or slow down the speed of the at least one ventilator unit. The higher speed may result in collecting more hot air, hot steam, hot air and hot steam or cool air into the at least one duct for providing the air stream towards the sauna sweat room.

The damper regulating unit configured to regulate the at least one damper in an open or closed position based on the feedback from at least one of selected from the $CO_2$ sensor, the temperature sensor, the sensor configured to detect users inside the sauna sweat room, the sensor configured to detect a state of a sauna door, the humidity sensor. Depending on the feedback based on the previously mentioned sensors, the at least damper may be more opened or more closed to achieve desired conditions in the sauna sweat room.

The control system may further comprise a remote server connected to the apparatus over communication network and configured to collect the sensor data, monitor the status of the apparatus, receive the user input and based on the user input configure the sauna sweat room heating regimes, store the computer program for controlling a sauna heating system. The control system may further comprise a remote control connectable to the control unit and arranged to control by the user the heating regimes. In an embodiment, the control system is controlled by a user via user interface connected to the remote server. The user interface is further connected to an alarm unit.

The present disclosure provides a method of heating a sauna sweat room, the method comprising receiving a hot air heated by a heat accumulator in a duct comprising a first end and a second end, the hot air having temperature from 50° C. up to 170° C.; receiving in the at least one duct a cool air having lower temperature than the hot air; mixing the received hot air with the received cool air to obtain a mixed air stream; directing at least part of the mixed air stream towards a lower section of the sauna sweat room via the second end of the at least one duct.

The hot air is heated by the heat accumulator. Because of the heat, the hot air would rise from the heat accumulator and heat up the upper section of the sauna sweat room significantly more than the lower section of the sauna sweat room. However, as the hot air is received in the at least one duct, the hot air will be collected to prevent uneven distribution of the hot air inside the sauna sweat room. Furthermore, the cool air having a lower temperature than the hot air will be received in the at least one duct, where the hot air and the cool air are mixed to obtain a mixed air stream which temperature is lower than the hot air and higher than the cool air. The at least part of the mixed air stream is directed towards the lower section of the sauna sweat room to evenly heat up the sauna sweat room. Without collecting the hot air and mixing it with the cool air, the hot air would be accumulated in the upper section, while the lower section would stay much cooler. However, releasing the mixed air stream comprising the hot air mixed with the cool air enables to evenly heat up the sauna sweat room and provide pleasant sauna conditions.

The hot air can be continuously collected from the upper section and directed to the lower section of the sauna sweat room. By continuous circulation of the hot air, a better sauna experience can be obtained, as the skin and hot air contact is more efficient leading to more effective sweating. Furthermore, as the method of heating the sauna sweat room enables to obtain an even temperature throughout the sauna sweat room, a sauna experience can be enjoyed also in the lower section.

According to the embodiments of the present disclosure, the hot air is further collected from at least one location of the sauna sweat room selected from a ceiling area of the upper section of the sauna sweat room, a floor area of the lower section of the sauna sweat room, directly above the electrical heating unit, inside the electrical heating unit, directly above the heat accumulator, or directly inside the heat accumulator.

The hot air provided by the heat accumulator will be released into the sauna sweat room and directed to the upper section. This however will leave the lower section much cooler than the upper section and will cause discomfort to the person sitting on the sauna bench, having his head in the upper section of the sauna sweat room. To avoid the hot hair accumulating only in the upper section, the hot air can be collected from multiple regions of the sauna sweat room or directly from the heat accumulator or from inside the heat accumulator. By collecting the hot air by the at least one first inlet, the hot air cannot accumulate only in the upper section of the sauna sweat room and a milder environment can be generated. The hot air is then be directed via the at least one duct and the ventilator unit towards the lower section, which enables to fill the sauna sweat room evenly and creates a pleasant environment.

The hot air may be collected directly above the heat accumulator or directly inside the heat accumulator. This ensures that there are no losses on directing the hot air into the at least one duct. Also, generally, the air above the electrical heating unit is burning hot and it is not recommended to place for example hands above the electrical heating unit, when in use. However, when the hot air is collected before it can rise from the electrical heating unit, it is safe to touch the air above the electrical heating unit as well.

According to the embodiments of the present disclosure, the cool air is collected from at least one location selected from outside the sauna sweat room, the lower section of the sauna sweat room, a floor area of the lower section of the sauna sweat room, an external ventilation unit. The cool air may be collected from the lower section or the floor area, as generally, temperature in the lower section and in the floor area of the sauna sweat room is lower than in the upper section. Collecting cool air from the lower section or the floor area does not significantly cool down the hot air and therefore, less heating and energy is necessary to keep an even temperature inside the sauna sweat room. The cool air collected from outside the sauna sweat room or from the external ventilation unit comprises more oxygen and therefore, the air quality in the sauna sweat room can be raised. The cool air can be collected from multiple locations at same or different time periods.

In an aspect, an embodiment of the present disclosure provides a computer program for controlling a sauna heating system comprising instructions which, when the computer program is executed by a control system comprising a control unit, causes the control system to perform the method according to the present disclosure. The computer program may enable to choose the temperature, date, time to turn on a sauna heating system for heating up a sauna sweat room. Furthermore, the computer program may for example comprise selection about timing, humidity level and $CO_2$ concentration. The computer system may turn on a sauna heater once a door of the sauna sweat room is closed. Also, the computer system may send a notice to a user device, once the predefined conditions in the sauna sweat room are achieved or for example, 15, 10 or 5 minutes before reaching the predefined conditions. Furthermore, the ventilation unit may be started only when persons inside the sauna sweat room are detected. At the same time, temperature and $CO_2$ levels are measured and depending on the results, the speed of the ventilator unit, the at least one first air inlet or the at least one second air inlet can be adjusted. For example, if the $CO_2$ level does not exceed a selected 550 ppm, the at least one second air inlet does not open, however if the selected value is exceeded, the at least one second air inlet will collect the cool air until the sauna sweat room is ventilated, for example, until 450 ppm of $CO_2$ level is reached. The computer system enables to provide a demand-based ventilation and does not waste energy on heating the sauna sweat room.

According to an example of the present disclosure the hot air is sucked through the first air inlet at the first end into the at least one duct directly from the heat accumulator of the heating unit, where the air has the highest and hottest temperature. Without collecting the hot air from the heat accumulator, the hot air would rise to the upper section of the sauna sweat room and thereby the temperature in the ceiling area may be e.g., between 130° C.-140° C. The temperature in a floor area of the lower section of the sauna sweat room may be e.g., between 25° C.-40° C., making a huge temperature difference between lower and upper sections. By collecting the hot air directly from the heat accumulator and directing the hot air towards the lower section of the sauna sweat room, the temperature inside the sauna sweat room is harmonized. A ventilator of the apparatus directs the hot air sucked into the at least one duct towards the air outlet at second end of the at least one duct from where the hot air is released to a floor area of the lower section of the sauna sweat room. The released hot air starts mixing with the cool air in the floor area and raise up to the higher sections of the sweat room. This way the apparatus enables continuously to mix and circulate the air in the sauna sweat room and thus homogenize the temperature in the sauna sweat room.

In another example of the present disclosure the hot air is sucked through the first air inlet at the first end into the at least one duct from the heat accumulator. In the embodiment the at least one duct comprises at least one second air inlet, which enables to mix the hot air sucked into the at least one duct with the air having temperature about the lower section of the sauna sweat room may be e.g., between 30° C.-50° C. The mixed air is released to a floor area of the lower section of the sauna sweat room. This way the apparatus enables continuously to mix and circulate the air in the sauna sweat room and thus homogenize the temperature in the sauna sweat room. This, when hot water is poured to the heat accumulator, enables to achieve a smooth effect wherein the mix of hot steam and hot air raising up from the heat accumulator does not cause burning feeling.

In yet another embodiment, the hot air is sucked through the first air inlet at the first end into the at least one duct from the heat accumulator, where the air has the highest and hottest temperature. The temperature in the ceiling area may be e.g., between 145° C.-155° C. In the embodiment the at least one duct comprises at least one third air inlet, which enables to direct cool air into the at least one duct from outside the sauna sweat room, which by the working ventilator is mixed with the hot air in the at least one duct and the mixed air is released to a floor area of the lower section of the sauna sweat room. This way the apparatus enables continuously to mix and circulate the air in the sauna sweat room to homogenize the temperature in the sauna sweat room and thus enables to achieve a smooth effect wherein the mix air, which may comprise the hot steam, starting raising from the lower sections to the upper sections of the sauna sweat room does not cause any burning feelings.

In another example, the apparatus further comprises one or more second hot air inlets on the front side of the central area of the at least one duct and one or more cool air inlets on one or both sides of the at least one duct. The hot air is sucked into the at least one duct through the first air inlet at the first end into the at least one duct from the heat accumulator and through the one or more second hot air inlets on the front sides of the at least one duct. The second hot air inlets may be located at different heights. This embodiment enables to suck the hot air into duct directly above a heat accumulator of the heating unit and from a ceiling area of the upper section of the sauna sweat room. The hot air sucked into the at least one duct is mixed by the working ventilator with the cool air directed to the at least one duct through the one or more cool air inlets, which enables to provide more effective mixing of the air from the different heights of the sauna sweat room.

In another embodiments the apparatus comprises a duct, which enables to install the apparatus away from the sauna sweat room wall, e.g., to the middle of the sauna sweat room or between the two or more sauna benches or surrounded by the sauna benches so that the sauna users can sit on the sauna benches on different sides of the apparatus or can sit on the sauna benches around the apparatus.

In such embodiments the apparatus may be attached to the ceiling of the sauna sweat room by a hanging means such as a chain, a rope, a rod or other suitable means. The apparatus is configured to receive a cool air from a floor area via opening below the at least one duct and the ventilator unit. The apparatus also may comprise a water reservoir next to a heat accumulator and an automatically or manually operated water adding unit, which is configured to add a predefined amount of water during predefined time periods. In an embodiment, wherein the water adding unit is automatically operated, the water adding unit is connected to the control unit and the predefined amount of water can be adjusted via the user interface. The automatically operated water adding unit may be arranged to pour the water to the heat accumulator by spraying or by dripping in certain time intervals or configured to react to the temperature rise or fall.

In such embodiments the at least one duct may be arranged so that the hot air inlet allow to direct the hot air into the at least one duct directly from above the heat accumulator and the apparatus comprises additional cool air inlets under the bottom of the heating unit. The hot air inlet may be arranged at the height 150-250 mm from the upper surface of the heat accumulator. The hot air inlet may be arranged at the height from 150, 155, 160, 165, 170, 175, 180, 185, 190, 195, 200, 205, 210, 215, 220, 225, 230, 235, 240 or 245 mm up to 160, 165, 170, 175, 180, 185, 190, 195, 200, 205, 210, 215, 220, 225, 230, 235, 240, 245 or 250 mm from the upper surface of the heat accumulator. Such additional cool air inlets provide an effect that the cool air directed to the heating unit through the additional cool air inlets. The cool air moving through the heating unit towards the upper part of the heating unit acts as an ejector, i.e., the cool air moving upwards pulls along the hot air from above the heat accumulator.

The at least one duct comprises an upper hot air inlet directly above the heat accumulator and a lower air inlet behind the heat accumulator or near the floor area of the sauna sweat room, which heats the lower air layers in the sauna sweat room. This allows the sauna sweat room temperature to be homogenized.

The upper hot air inlet of the at least one duct above the heater absorbs both steam caused by the water poured to the heat accumulator and heated hot air, which is mixed with the cool air taken from below the heating unit and, after mixing, is directed to the lower layers of the sauna sweat room. If necessary, additional air can also be taken from inside the heater between the stones.

Alternatively, instead of directing the cool air from the additional cool air inlets at the bottom of the heating unit, the cool air inlets may be arranged at one or both sides of the at least one duct or the at least one duct may comprise the cool air inlets at one or both sides in addition to the cool air inlets at the bottom of the heating unit. This enables to homogenize the heated hot air with the cool air and provide continuous air circulation.

In another examples, a duct is formed through a heat accumulator of the heating unit. The heating unit is surrounded by a duct and a first end of the at least one duct is at an upper edge of the heating unit and a second end of the at least one duct is below the heating unit in a floor area. The hot air or hot air comprising hot steam will be collected directly from a heat accumulator and directed via the at least one duct towards the floor area of the sauna sweat room.

Alternatively, the at least one duct may be located inside a heating unit, in the middle of a heat accumulator. A first end of the at least one duct is opens in the middle of the heat accumulator and a second end of the at least one duct opens below the heating unit in a floor area. The first end of the at least one duct configured to suck hot air or hot air comprising hot steam directly from the heat accumulator and the hot air or hot air comprising hot steam is provided towards the floor area of the sauna sweat room.

Such embodiments enable to direct the cool air to the at least one duct directly through the heat accumulator, wherein the cool air when moving through the heating unit towards the upper part of the heat accumulator works as an ejector, and the cool air moving upwards pulls along the hot air from above the heat accumulator.

According to the embodiments, the power and speed of the ventilator unit may be adjustable, which ensures the flexibility of adjustment according to the wishes of sauna users. Openings of the air inlets can be funnel-shaped to harmonize air movement and reduce air vortices and noise of moving air.

Alternatively, hot air inlets above the heating unit can be used, which enables to mix extra hot air (e.g., 120° C.-170° C.) taken directly from the accumulator (e.g., between the stones) or between the heating elements and cool air (e.g., 30° C.-50° C.) is partially mixed with the, which achieves a uniform intense indoor temperature in the sauna, which improves sweating, activates circulation of the air in the sauna sweat room, improves the heat exchange between the body of the sauna user and the air in the sauna sweat room, while avoiding the formation of unpleasant hot winds.

The embodiments according to the present disclosure enable need-based ventilation. I.e., the amount of oxygen depends on several factors, e.g., number of people at the same time in the sauna sweat room, the size of the sauna sweat room, heating intensity, temperature, humidity. Directing the oxygen rich air from the lower sections of the sauna sweat room to the upper sections and/or directing additional fresh air outside the sauna sweat room (e.g., from another room, from ventilation inlet, from outside the building) to the sauna sweat room during heating the sauna sweat room enables better ventilation and air circulation. The better ventilation is especially important, e.g., when too high $CO_2$ level is measured by the $CO_2$ sensor.

According to the embodiments of the present disclosure the better ventilation further enables to save energy for heating the sauna sweat room. In the typical prior art sauna sweat rooms when more fresh air is needed then the door or window of the sauna sweat room has to be opened, which leads the hot air out from the sauna sweat room and more energy is needed to heat up the sauna sweat room again.

DETAILED DESCRIPTION OF DRAWINGS

FIG. 1 illustrates a side view of an embodiment of an apparatus of heating a sauna sweat room 100 according to the present disclosure. The sauna sweat room comprises an upper section 101 and a lower section 102, a sauna door 103 for entrance and exit, a first bench 104 in the lower section 102. A person 106 visiting the sauna sweat room 100 is sitting on the first bench 104.

The apparatus comprises an electrical heating unit 110 and a duct 120. The electrical heating 110 unit comprises a heating element 112, a heat accumulator 114 at least partially surrounding the heating element 112. The at least one duct 120 comprises a first end 122 and a second end 124 locating lower than the first end 122, an air inlet 126 configured to receive a hot air 140 heated by the heat accumulator 114, a ventilator unit 130 comprising a ventilator 132 and located lower from a central area of the at least one duct 120 between the first end 122 and the second end 124 of the at least one duct 120 and an air outlet 128 located at the second end 124. The air inlet 126 is located directly above the heat accumulator 114 to receive the hot air 140 directly from the heat accumulator 114.

When the hot air 140 above and around the electrical heating unit 110 is heated, the hot air flow 141 is sucked through the first air inlet 126 into the at least one duct 120 and directed through the at least one duct 120 towards the second end 124. The ventilator unit 130 is configured to direct at least part of the hot air 140 heated by the heat accumulator 114 from the first hot air inlet 126 towards the second end 124. A pile made of stones in the heat accumulator 114 is higher in the middle 162, where the stone due to the thicker layer of stones have lower temperature than the stones on the sides 164. The air outlet 128 is configured to release the received hot air flow towards the lower section 102 of the sauna sweat room 100 from where it raises to the ambient area of the sauna sweat room and thus homogenizes the temperature of the lower section 102 and upper section 101 of the sauna sweat room 100. For enabling more effective air circulation, the sauna sweat room may comprise sweat room ventilation, e.g., a ventilator 152.

Figure 2A:
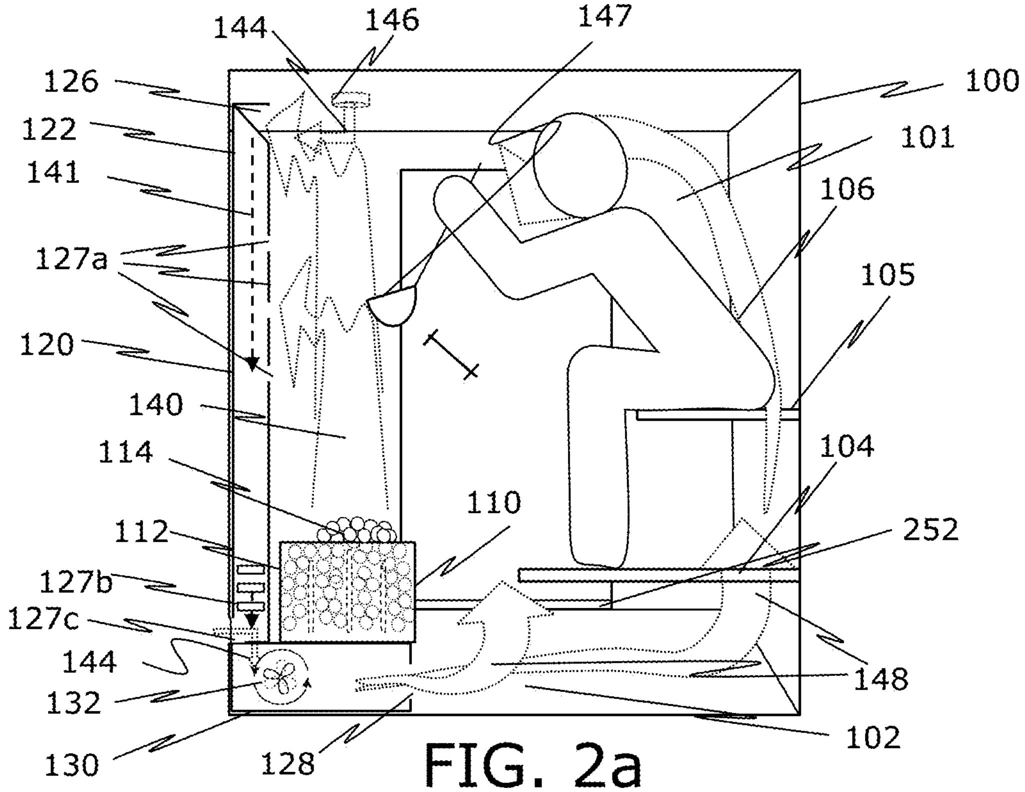
FIG. 2*a* illustrates a side view of another embodiment of an apparatus of heating a sauna sweat room according to the present disclosure.
Figure 2B:
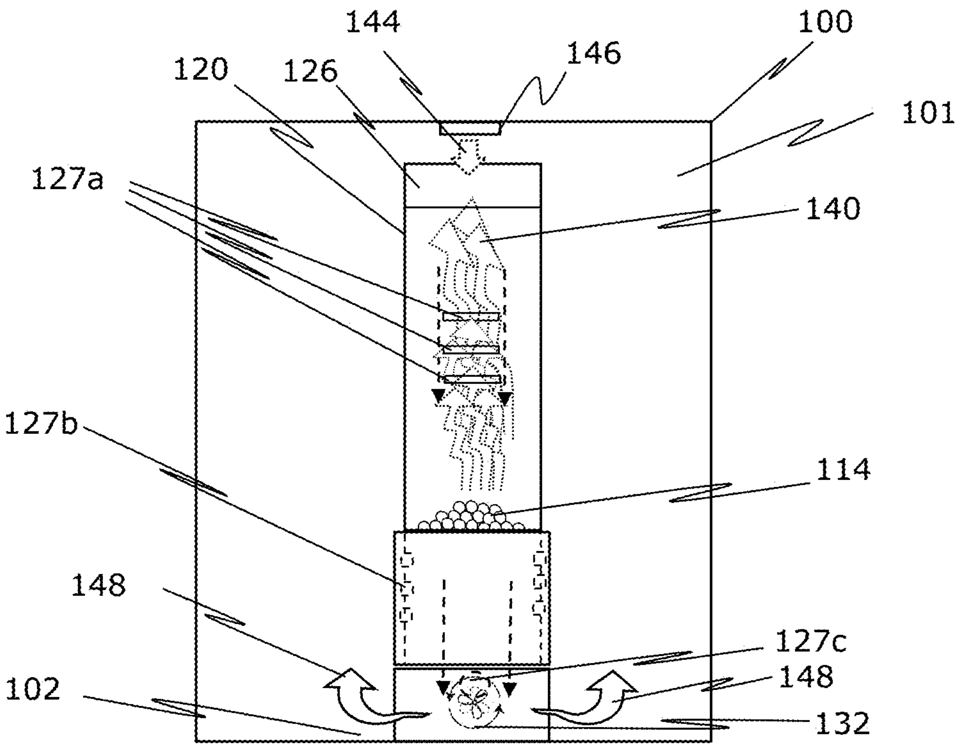
FIG. 2*b* illustrates a front view of the embodiment of FIG. 2*a;*

FIG. 2*a* illustrates a side view of another embodiment of an apparatus of heating a sauna sweat room according to the present disclosure. FIG. 2*b* illustrates a front view of the embodiment of FIG. 2*a*. In the embodiment the sauna sweat room comprises an upper section 101 and a lower section 102, a sauna door 103 for entrance and exit, a first bench 104 in the lower section 102 and a second bench 105 as a main bench in the upper section 101. A person 106 visiting the sauna sweat room 100 is sitting on the second bench 105 in the upper section 101.

The apparatus comprises hot air inlets 127*a* on the front side of the central area of the at least one duct, and cool air inlets 127*b* on one or both sides of the at least one duct, where the air inlet 127*b* is configured to receive a cool air 144 from the lower section of a sauna sweat room 100 and a third air inlet 127*c* is configured to receive the cool air 144 outside the sauna sweat room 100. The air inlets 127*b* are located on one or both sides of the at least one duct. The cool air 144 can also be obtained from an external ventilation unit 146. The hot air 140 further comprises hot steam generated by adding water with a sauna scoop 147 on the heat accumulator. The hot air 140 comprising hot steam is sucked into the at least one duct 120 via air inlets 126 and 127*a*. The cool air 144 having lower temperature than the hot air 140 is sucked into the at least one duct 120 and mixed with the hot air 140 comprising hot steam by the ventilator unit 130 and a mixed air stream 148 is obtained. The mixed air stream 148 is directed towards the lower section 102 of the sauna sweat room 100 from where it is evenly distributed throughout the sauna sweat room 100. For enabling more effective air circulation, the sauna sweat room may comprise sweat room ventilation, e.g., an opening between the door and floor 252.

Figure 3:
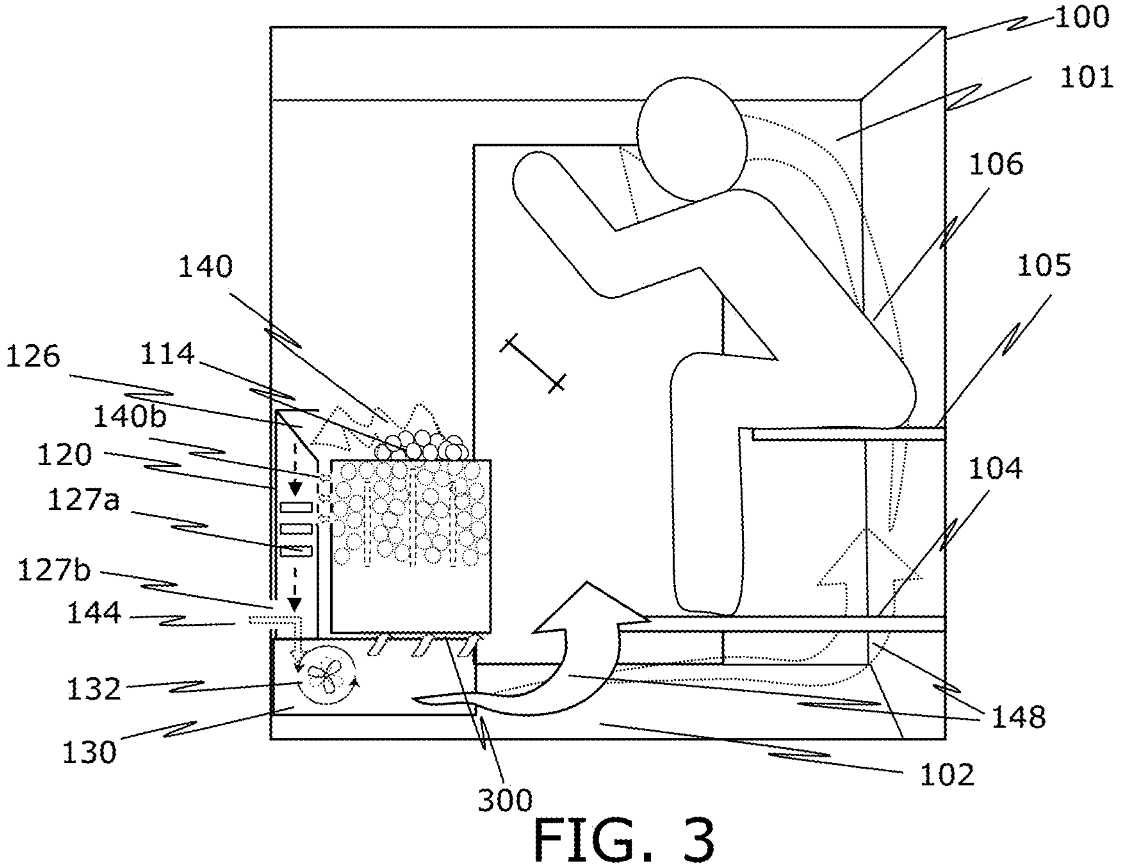
FIG. 3 illustrates a side view of another embodiment of an apparatus according to the present disclosure.
Figure 4:
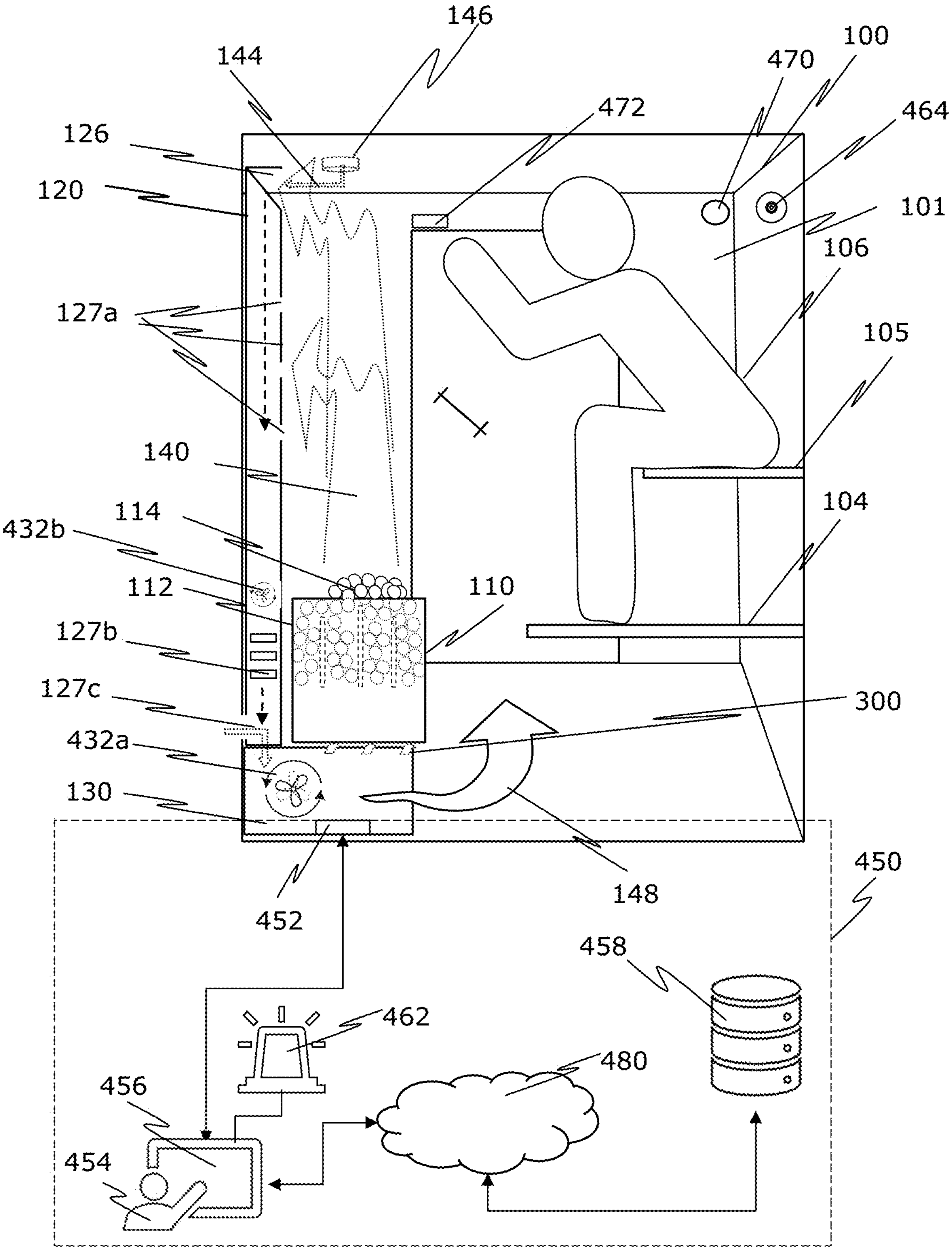
FIG. 4 illustrates an embodiment of the apparatus of FIG. 3 comprising a control system according to the present disclosure.

FIG. 3 illustrates a side view of another embodiment of an apparatus according to the present disclosure. In the embodiment the sauna sweat room comprises an upper section 101 and a lower section 102, a sauna door 103 for entrance and exit, a first bench 104 in the lower section 102 and a second bench 105 as a main bench in the upper section 101. A person 106 visiting the sauna sweat room 100 is sitting on the second bench 105 in the upper section 101. The apparatus comprises a duct 120 configured to collect hot air 140 at height about 150 mm up to 250 mm above the heat accumulator 114. The apparatus further comprises second air inlets 127*a*, which are collecting the hot air 140*b* directly from the heat accumulator 114. The hot air 140 and 140*b* is mixed with cool air 144 collected by the air inlet 127*b* by a ventilator unit 130 and a mixed air stream 148 is obtained. The mixed air stream 148 is directed towards the lower section 102 of where it is evenly distributed throughout the sauna sweat room 100. The apparatus further comprises additional cool air inlets 300 under the bottom of the heating unit FIG. 4 illustrates an embodiment of the apparatus of FIG. 3 further comprises a control system according to the present disclosure. The apparatus comprises a control system 450 comprising a control unit 452, sensor 464 (e.g., a temperature sensor, a $CO_2$ sensor, a humidity sensor, an oxygen sensor), a sensor 470 configured to detect users inside the sauna sweat room, a door sensor 472 configured to detect a state of a sauna door. The control system 450 is controlled by a user 454 via user interface 456 connected to the remote server 458. The user interface 456 is further connected to an alarm unit 462. The remote server 458 is connected to the apparatus over the communication network 480.

Figure 5A:
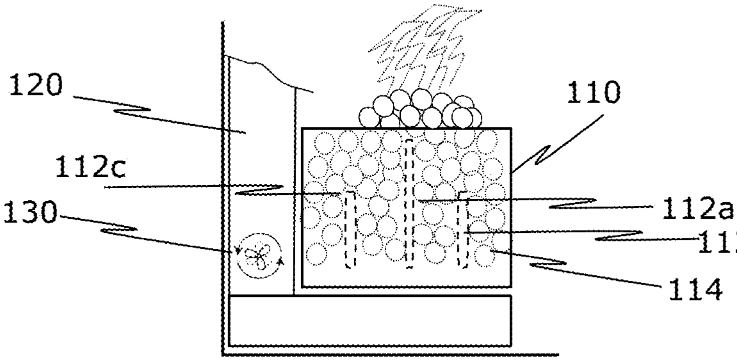
FIG. 5*a* illustrates different embodiments of the apparatus according to the present disclosure, wherein the apparatus is placed on the floor near the wall.

FIG. 5*a* illustrates different embodiments of the apparatus according to the present disclosure, wherein the apparatus is placed on a floor next to a wall of a sauna sweat room. The apparatus comprises a duct 120 and an electrical heating unit 110. The at least one duct 120 comprises a ventilator unit 130. The electrical heating 110 unit comprises heating elements 112*a*, 112*b*, 112*c* surrounded by a set of stones being a heat accumulator 114. One of the heating elements 112*a* is located higher than the other heating elements 112*b*, 112*c*.

Figure 5B:
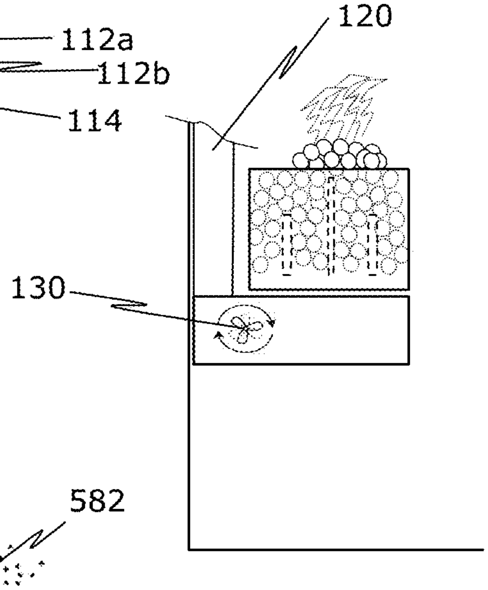
FIG. 5*b* illustrates different embodiments of the apparatus according to the present disclosure, wherein the apparatus is attached to the wall above the floor.

FIG. 5*b* illustrates different embodiments of the apparatus according to the present disclosure, wherein the apparatus is attached to the wall above the floor. The apparatus is placed next to a wall and higher from a floor of a sauna sweat room. A ventilator unit 130 inside a duct 120 is configured to blow a cool air collected from a lower section via the at least one duct 120 towards an upper section of the sauna sweat room.

Figure 5C:
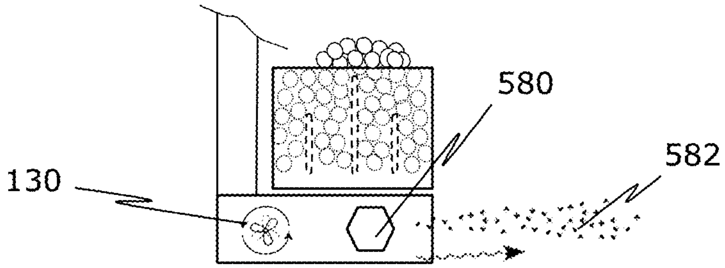
FIG. 5*c* illustrates different embodiments of the apparatus according to the present disclosure, wherein the apparatus comprises an apparatus for generating aromatherapy, an air ionizer, or a salty environment generator.

FIG. 5*c* illustrates different embodiments of the apparatus according to the present disclosure, wherein the apparatus comprises therapy means 580 selected from at least one of an apparatus for generating aromatherapy and/or an air ionizer or a salty environment generator, which are located after a ventilator unit 130 and through which a enriched air flow 582 is provided before reaching a lower section of the sauna sweat room.

Figure 5D:
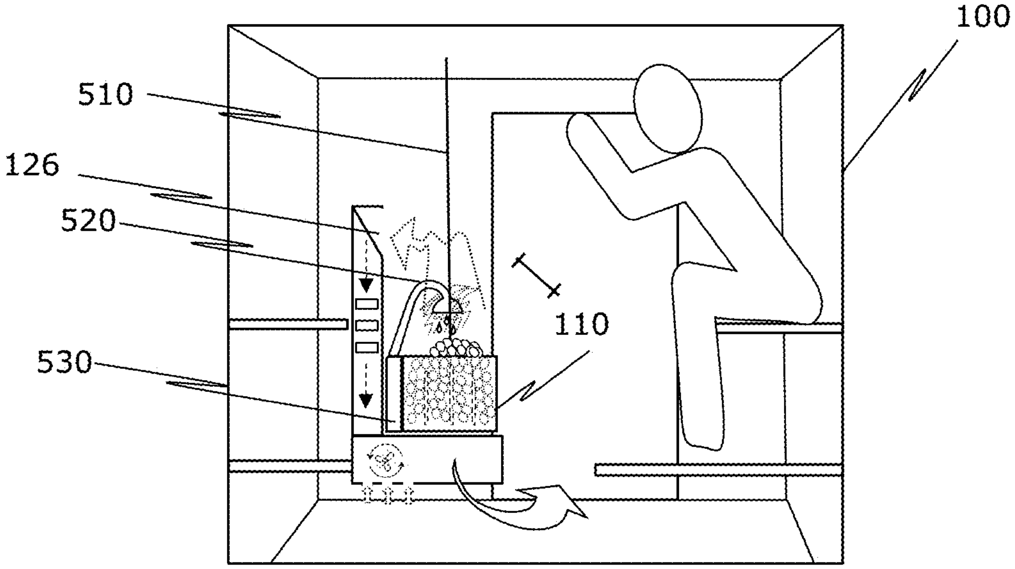
FIG. 5*d* illustrates an embodiment, wherein the apparatus is hung from the ceiling of the sauna sweat room.

FIG. 5*d* illustrates an embodiment, wherein the apparatus is hung from the ceiling of the sauna sweat room. In an embodiment, the apparatus can be attached to the ceiling of the sauna sweat room by a hanging means 510. The apparatus is configured to receive a cool air from a floor area via opening below the at least one duct and the ventilator unit. The apparatus also comprises a water reservoir 520 next to a heat accumulator and a water adding unit 530, which is configured to add a predefined amount of water during predefined time periods.

Figure 5E:
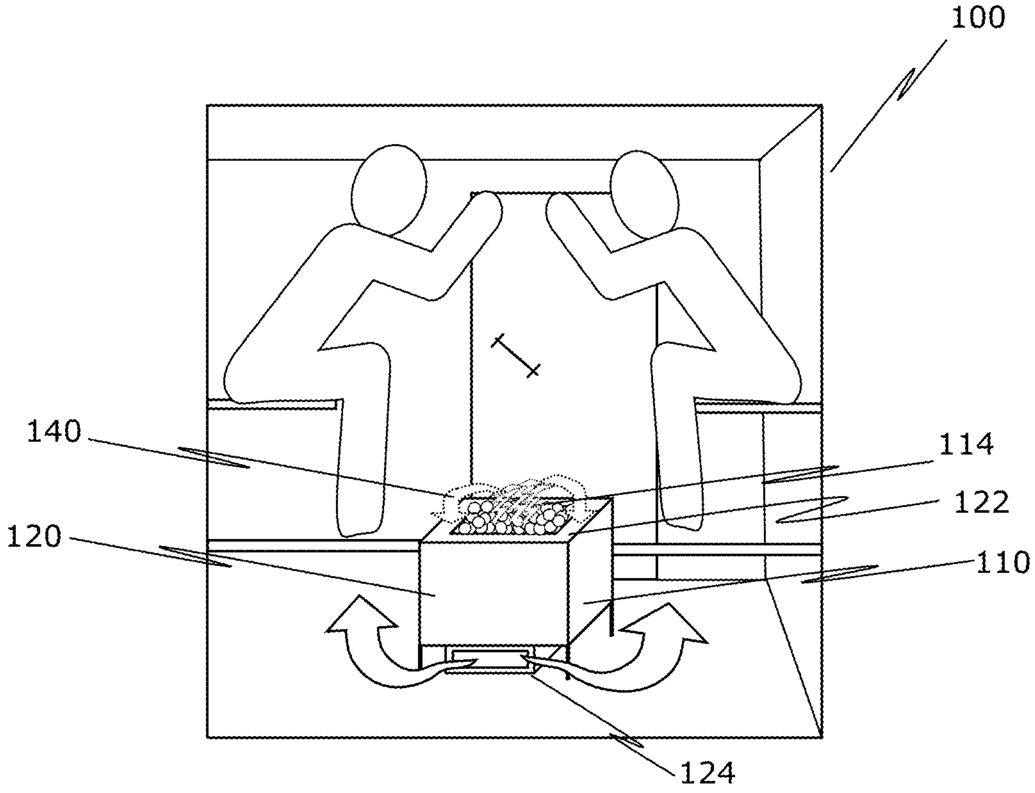
FIG. 5*e* illustrates an exemplary embodiment, wherein the apparatus is placed on the floor of the sauna sweat room.

FIG. 5*e* illustrates an exemplary embodiment, wherein the apparatus is placed on the floor of the sauna sweat room 100. In this exemplary embodiment, the heating unit 110 is surrounded by a duct 120 and a first end 122 of the at least one duct 120 is at an upper edge of the heating unit and a second end 124 of the at least one duct 120 is below the heating unit in a floor area. The hot air 140 or hot air comprising hot steam will be collected directly from a heat accumulator 114 and directed via the at least one duct 120 towards the floor area of the sauna sweat room 100.

Figure 5F:
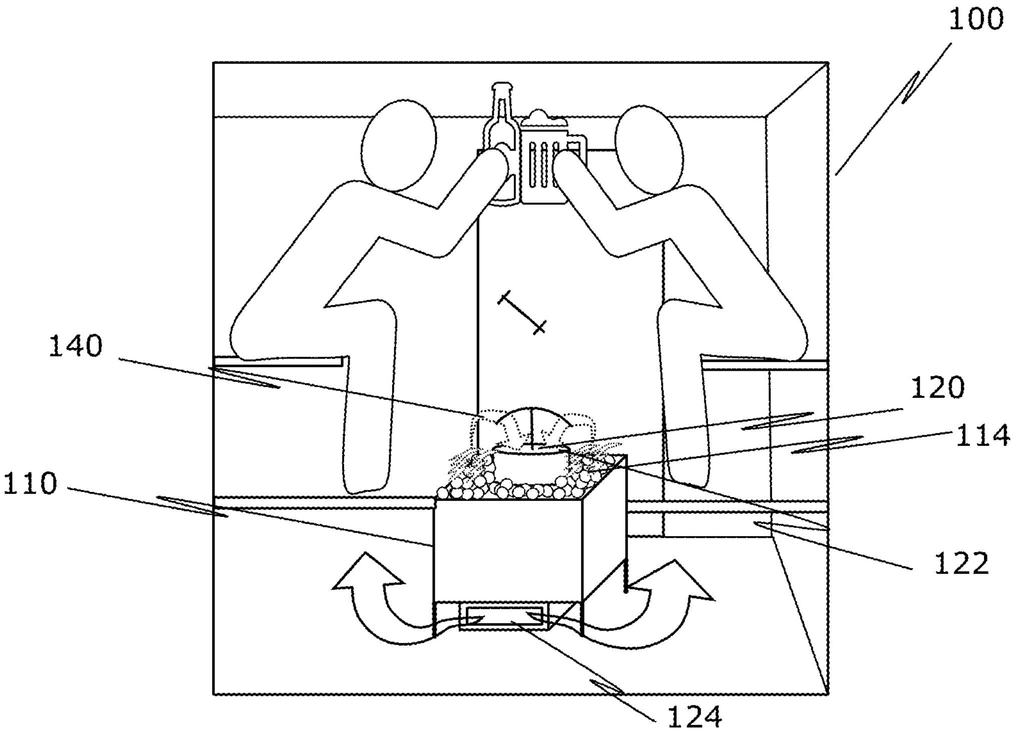
FIG. 5*f* illustrates another exemplary embodiment, wherein the apparatus is placed on the floor of the sauna sweat room.

FIG. 5*f* illustrates another exemplary embodiment, wherein the apparatus is placed on the floor of the sauna sweat room 100. In this exemplary embodiment, a duct 120 is located inside a heating unit 110, in the middle of a heat accumulator 114. A first end 122 of the at least one duct 120 opens in the middle of the heat accumulator 114 and a second end 124 of the at least one duct 120 opens below the heating unit 110 in a floor area. The first end 122 of the at least one duct is configured to suck hot air 140 or hot air comprising hot steam directly from the heat accumulator 114 and the hot air 140 or hot air comprising hot steam is provided towards the floor area of the sauna sweat room 100. With the embodiments of Figures FIG. 5*e* and FIG. 5*f* it is safe to touch the air above the heating unit without burning any body parts.

Figure 5G:
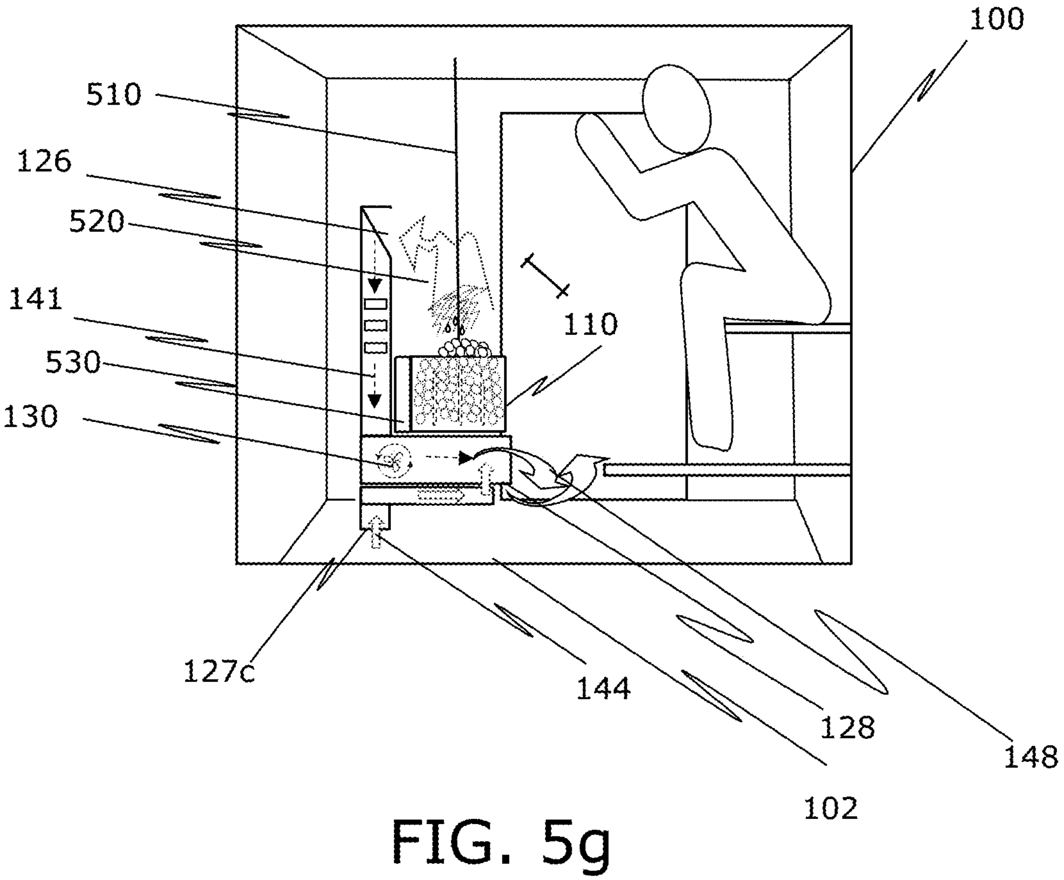
FIG. 5*g* illustrates another exemplary embodiment, wherein the apparatus is placed on the floor of the sauna sweat room.
Figure 6A:
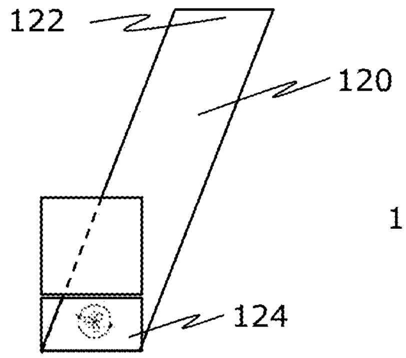
FIG. 6*a*, FIG. 6*b*, FIG. 6*c*, FIG. 6*d* illustrate exemplary alternative embodiments of the at least one duct of different embodiments according to the present disclosure.
Figure 6B:
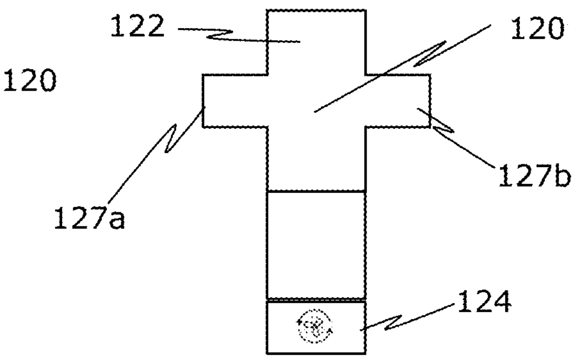
Figure 6C:
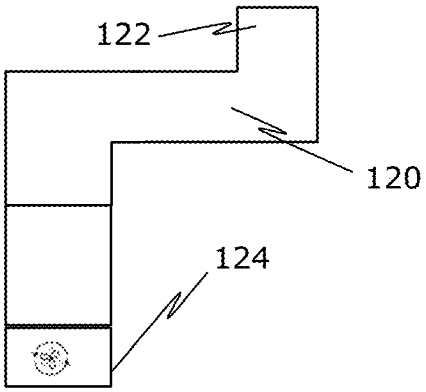
Figure 6D:
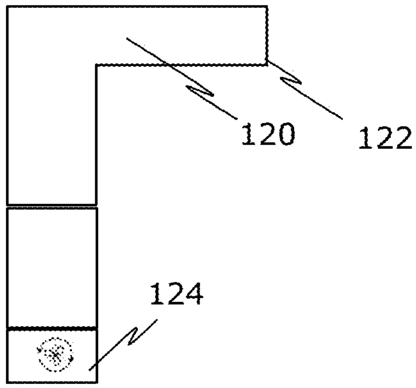

FIG. 5*g* illustrates another exemplary embodiment, wherein the apparatus is placed on the floor of the sauna sweat room 100. The hot air 141 is directed via the ventilator unit 130 towards the at least one air outlet 128. The cool air 144 is received via the at least one second air inlet 127*c* from a floor area of the lower section 102 of the sauna sweat room 100 and the at least one air outlet 128 is configured to mix the cool air 144 with the hot air 141 before directing the mixed air stream 148 towards the floor area of the sauna sweat room.

FIG. 6*a*, FIG. 6*b*, FIG. 6*c*, FIG. 6*d* illustrates exemplary alternative embodiments of the at least one duct of different embodiments according to the present disclosure. On FIG. 6*a*, the at least one duct 120 has a diagonal shape having a first end 122 and a second end 124. On FIG. 6*b*, the at least one duct 120 is a vertical duct comprising a first end 122, a second end 124 and second air inlets 127*a*, 127*b* in an upper section of the sauna sweat room. On FIG. 6*c*, the at least one duct 120 is an S-shaped duct having a first 122 end and a second end 124. On FIG. 6*d*, the at least one duct 120 is an L-shaped duct having a first end 122 and a second end 124.

Figure 7:
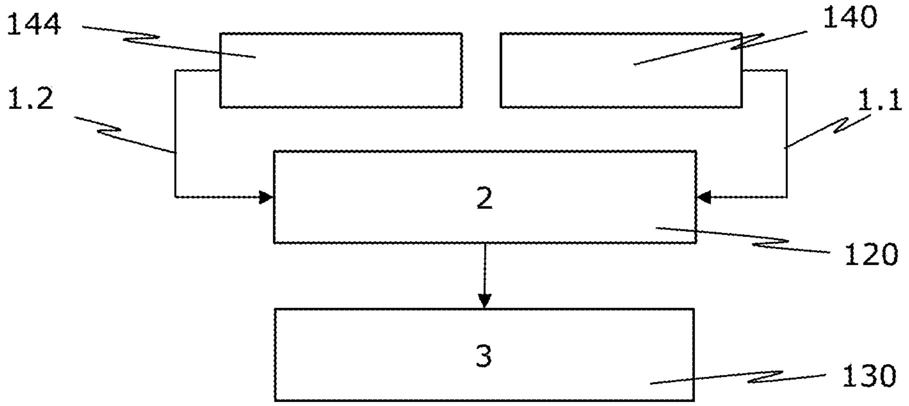
FIG. 7 illustrates a method of heating a sauna sweat room according to the present disclosure.

FIG. 7 illustrates a method of heating a sauna sweat room according to the present disclosure. At step 1.1, a hot air 140 heated by a heat accumulator is received in a duct 120 comprising a first end and a second end, the hot air having a temperature from 50° up to 170° C. At step 1.2, a cool air 144 is received in the at least one duct 120. At step 2, the received hot air 140 is mixed with the received cool air 144 to obtain a mixed air stream. At step 3, at least part of the mixed air stream is directed towards a lower section of the sauna sweat room via the second end of the at least one duct.

Modifications to embodiments of the present disclosure described in the foregoing are possible without departing from the scope of the present disclosure as defined by the accompanying claims. Expressions such as “Including”, “comprising”, “incorporating”, “have”, “is” used to describe and claim the present disclosure are intended to be construed in a non-exclusive manner, namely allowing for items, components or elements not explicitly described also to be present.

The invention claimed is:

1. An apparatus of heating a sauna sweat room, the apparatus comprising an electrical heating unit comprising
- at least one heating element,
- a heat accumulator at least partially surrounding the at least one heating element and exposed to the sauna sweat room, at least one duct connected to the electrical heating unit, the at least one duct comprising
- a first end and a second end, wherein the second end is located lower than the first end,
- at least one first air inlet disposed adjacent to and configured to receive at least hot air directly from the heat accumulator, the hot air having a temperature from 50° up to 170° C.,
- at least one ventilator unit inside the at least one duct, the at least one ventilator unit is configured to direct at least part of the hot air heated by the heat accumulator from the at least one first air inlet towards the second end,
- at least one air outlet located at the second end and configured to release at least part of the received hot air heated by the heat accumulator towards a lower section of the sauna sweat room.

2. An apparatus according to claim 1, wherein the hot air further comprises hot steam generated by water directed onto the heat accumulator.

3. An apparatus according to claim 1, wherein the at least one duct further comprises at least one second air inlet configured to receive a cool air having lower temperature than the hot air, wherein the at least one ventilator unit is further configured to mix the cool air with the hot air to obtain a mixed air stream, and wherein the at least one air outlet is further configured to direct the mixed air stream towards the floor area of the sauna sweat room.

4. An apparatus according to claim 1, further comprising at least one second air inlet configured to receive a cool air from a floor area of the lower section of the sauna sweat room and the at least one air outlet is configured to mix the cool air with the hot air before directing the mixed air stream towards the floor area of the sauna sweat room.

5. An apparatus according to claim 3, wherein the at least one second air inlet is configured to receive the cool air from at least one of selected from:
- outside the sauna sweat room,
- the lower section of the sauna sweat room,
- a floor area of the lower section of the sauna sweat room,
- an external ventilation unit.

6. An apparatus according to claim 1, wherein at least one of the at least one first air inlet, the at least one second air inlet, and the at least one air outlet comprises a damper.

7. An apparatus according to claim 1, wherein the electrical heating unit comprises empty spaces located at least one of selected from inside the heat accumulator, or between the at least one heating element and the heat accumulator.

8. An apparatus according to claim 1, wherein the heat accumulator comprises at least one of selected from a set of stones, a stone basket.

9. An apparatus according to claim 1, wherein the electrical heating unit further comprises at least one water reservoir.

10. An apparatus according to claim 1, wherein height of the at least one duct comprises at least one of selected from a telescopic mechanism to shorten or expand the height of the at least one duct, multiple portions, which can be removed or reinstalled to adjust the height of the at least one duct.

11. An apparatus according to claim 1, wherein the at least one ventilator unit further comprises a therapy means comprising at least one of selected from an apparatus for generating aromatherapy, an air ionizer, a salty environment generator.

12. An apparatus according to claim 1, wherein the at least one first air inlet is further configured to collect hot air from at least one location of the sauna sweat room selected from a ceiling area of the upper section of the sauna sweat room, a floor area of the lower section of the sauna sweat room, directly above the electrical heating unit, inside the electrical heating unit, directly above the heat accumulator, directly inside the heat accumulator, or at least one side of the heating element.

13. An apparatus according to claim 1, wherein blowing direction of the at least one ventilator unit is at least one of selected from towards the second end of the at least one duct, or towards the first end of the at least one duct.

14. An apparatus according to claim 1, wherein two or more heating elements are positioned at different heights.

15. An apparatus according to claim 1, wherein the apparatus further comprises a control system comprising a control unit, and at least one sensor selected from a temperature sensor configured to measure the temperature inside the sauna sweat room, a CO2 sensor configured to measure CO2 level inside the sauna sweat room, an oxygen sensor configured to measure oxygen level inside the sauna sweat room, a sensor configured to detect users inside the sauna sweat room, a sensor configured to detect a state of a sauna door, a humidity sensor configured to measure humidity inside the sauna sweat room, a ventilator speed regulator configured to control a speed of the at least one ventilator unit, a damper regulating unit configured to regulate the at least one damper in an open or closed position.

16. An apparatus according to claim 1, wherein the at least one ventilator unit is located lower from the at least one first air inlet.

17. An apparatus according to claim 1, wherein the at least one ventilator unit is located lower from the heat accumulator.

18. An apparatus according to claim 1, wherein the at least one ventilator unit is located lower from the at least one second air inlet.

19. A method of heating a sauna sweat room, the method comprising providing heat to a heat accumulator exposed to the sauna seat room by at least one heating element comprised in an electrical heating unit;

receiving a hot air adjacently and directly from the heat accumulator via at least one first air inlet of at least one duct connected to the electrical heating unit, the at least one duct comprising a first end and a second end, the hot air having a temperature from 50° up to 170° C.;

directing at least part of the hot air towards a lower section of the sauna sweat room via at least one air outlet at the second end of the at least one duct by using at least one ventilator unit inside the at least one duct.

20. A method according to claim 19 further comprising receiving a cool air via at least one second air inlet, the cool air having lower temperature than the hot air, obtaining a mixed air stream by mixing the cool air and the hot air with the at least one ventilator unit, directing the mixed air stream towards the floor area of the sauna sweat room via the at least one air outlet.

21. A method according to claim 19 further comprising receiving a cool air via at least one second air inlet from the floor area of the lower section of the sauna sweat room, obtaining a mixed air stream by mixing the cool air and the hot air in the at least one air outlet, directing the mixed air stream towards the floor area of the sauna sweat room via the at least one air outlet.

22. A method according to claim 19, wherein the at least one ventilator unit is located lower from the at least one first air inlet.

23. A method according to claim 19, wherein the hot air is collected from at least one location of the sauna sweat room selected from a ceiling area of the upper section of the sauna sweat room, a floor area of the lower section of the sauna sweat room, directly above the electrical heating unit, inside the electrical heating unit, directly above the heat accumulator, or directly inside the heat accumulator.

24. A method according to claim 20, wherein the cool air is collected from at least one location selected from outside the sauna sweat room, the lower section of the sauna sweat room, a floor area of the lower section of the sauna sweat room, an external ventilation unit.

25. A computer program product for controlling a sauna heating system comprising an apparatus of heating a sauna sweat room comprising:

an electrical heating unit comprising:

at least one heating element, a heat accumulator at least partially surrounding the at least one heating element and exposed to the sauna sweat room, at least one duct connected to the electrical heating unit, the at least one duct comprising a first end and a second end, wherein the second end is located lower than the first end, at least one first air inlet disposed adjacent to and configured to receive at least hot air directly from the heat accumulator, the hot air having a temperature from 50° up to 170° C., at least one ventilator unit inside the at least one duct, the at least one ventilator unit is configured to direct at least part of the hot air heated by the heat accumulator from the at least one first air inlet towards the second end, at least one air outlet located at the second end and configured to release at least part of the received hot air heated by the heat accumulator towards a lower section of the sauna sweat room, the computer program product comprising machine readable instructions encoded on a non-transitory computer readable medium which, when the computer program product is executed by a control system comprising a control unit, causes the control system to perform the method according to claim 19.

* * * * *